(12) United States Patent
Cooke et al.

(10) Patent No.: US 8,839,212 B2
(45) Date of Patent: *Sep. 16, 2014

(54) METHOD, APPARATUS AND COMPUTER PROGRAM PRODUCT FOR AUTOMATICALLY GENERATING A COMPUTER PROGRAM USING CONSUME, SIMPLIFY AND PRODUCE SEMANTICS WITH NORMALIZE, TRANSPOSE AND DISTRIBUTE OPERATIONS

(71) Applicant: Texas Tech University System, Lubbock, TX (US)

(72) Inventors: Daniel E. Cooke, Lubbock, TX (US); J. Nelson Rushton, Lubbock, TX (US); Brad Nemanich, Lubbock, TX (US)

(73) Assignee: Texas Tech University System, Lubbock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/042,699

(22) Filed: Sep. 30, 2013

(65) Prior Publication Data

US 2014/0109039 A1    Apr. 17, 2014

Related U.S. Application Data

(63) Continuation of application No. 12/711,614, filed on Feb. 24, 2010, now Pat. No. 8,549,486.

(60) Provisional application No. 61/156,374, filed on Feb. 27, 2009.

(51) Int. Cl.
*G06F 9/45* (2006.01)
*G06F 9/44* (2006.01)

(52) U.S. Cl.
CPC ............... *G06F 8/443* (2013.01); *G06F 8/456* (2013.01); *G06F 8/30* (2013.01)
USPC ............ 717/146; 717/140; 717/145; 717/149

(58) Field of Classification Search
USPC ......................................... 717/146, 140, 149
See application file for complete search history.

(56) References Cited

U.S. PATENT DOCUMENTS

| 5,175,856 A | 12/1992 | Van Dyke et al. |
| 5,179,702 A | 1/1993 | Spix et al. |

(Continued)

OTHER PUBLICATIONS

Cooke, Daniel E., et al., "Normalize, Transpose and Distribute: An Automatic Approach for Handling Nonscalars," AMC (2001).

(Continued)

*Primary Examiner* — Phillip H Nguyen
(74) *Attorney, Agent, or Firm* — Daniel J. Chalker; Edwin S. Flores; Chalker Flores, LLP

(57) ABSTRACT

A code generator and multi-core framework are executable in a computer system to implement methods as disclosed herein, including a method for the code generator to automatically generate multi-threaded source code from functional specifications, and for the multi-core framework, which is a run time component, to generate multi-threaded task object code from the multi-threaded source code and to execute the multi-threaded task object code on respective processor cores. The methods provide transparency to the programmer, and during execution, provide automatic identification of processing parallelisms. The methods implement Consume-Simplify-Produce and Normalize-Transpose-Distribute operations to reduce complex expression sets in a functional specification to simplified expression sets operable in parallel processing environments through the generated multi-threaded task object code. The result is a code generator which compiles transparent declarative code into multi-threaded code and that in the process identifies and assigns parallel processing paths to improve overall processing performance.

21 Claims, 9 Drawing Sheets

(56) References Cited

U.S. PATENT DOCUMENTS

| | | |
|---|---|---|
| 5,436,982 A | 7/1995 | Kimura et al. |
| 5,535,393 A | 7/1996 | Reeve et al. |
| 5,862,385 A | 1/1999 | Iitsuka |
| 6,367,070 B1 | 4/2002 | Haghighat et al. |
| 7,657,588 B2 | 2/2010 | Sirois |
| 7,926,046 B2 | 4/2011 | Halambi et al. |
| 8,229,014 B2 | 7/2012 | Cousineau |
| 8,549,496 B2 | 10/2013 | Cooke et al. |
| 2007/0169059 A1 | 7/2007 | Halambi et al. |
| 2009/0172353 A1 | 7/2009 | Su et al. |
| 2009/0288075 A1 | 11/2009 | Song et al. |

OTHER PUBLICATIONS

Cooke, Daniel E., et al., "The Role of Theory and Experiment in Language Design—A 15 Year Perspective," 18th IEEE International Conference on Tools with Artificial Intellegence (2006).

Andersen, Per Hojen, "A Parallel compiler for SequenceL," ProQuest Dissertations and Theses (2002).

METHOD, APPARATUS AND COMPUTER PROGRAM PRODUCT FOR AUTOMATICALLY GENERATING A COMPUTER PROGRAM USING CONSUME, SIMPLIFY AND PRODUCE SEMANTICS WITH NORMALIZE, TRANSPOSE AND DISTRIBUTE OPERATIONS

PRIORITY CLAIM AND CROSS-REFERENCE TO RELATED APPLICATIONS

This patent application is continuation of U.S. patent application Ser. No. 12/711,614 filed on Feb. 24, 2010 now U.S. Pat. No. 8,549,496 and U.S. Provisional Patent Application Ser. No. 61/156,374, filed on Feb. 27, 2009, the entire contents of which are incorporated herein by reference.

STATEMENT OF FEDERALLY FUNDED RESEARCH

The U.S. Government has a paid-up license in this invention and the right in limited circumstances to require the patent owner to license others on reasonable terms as provided for by the terms of Contract Nos.: NNG06GJ14G and NNJ06H3945A.

BACKGROUND OF THE INVENTION

The present invention relates generally to automatically generating iterative and parallel control structures executable by a computer responsive to functions and operators that define requirements for a computer program in a high-level language. The present invention relates more specifically to repeatedly applying a normalize, transpose and distribute operation to the functions and operators until base cases are determined.

High-level functional languages, such as LISP and Haskell, are designed to bridge the gap between a programmer's concept of a problem solution and the realization of that concept in code. In these languages, a program consists of a collection of function definitions, roughly isomorphic to their counterparts in nonexecutable mathematical notation. The language semantics then generate the data and control structures necessary to implement a solution. A great deal of the complexity of execution remains hidden from the programmer, making it easier and faster to develop correct code.

The ease and reliability afforded by high-level languages often comes at a cost in terms of performance. Common wisdom says that if a software product must perform better in terms of speed and memory, it must be written in a lower level language, typically with arcane looking optimized assembly code at the extreme end.

Over time, however, the trend is for more software to be developed in higher level languages. There are two reasons for this. The first is immediately apparent; machine performance tends to improve over time, bringing more applications within the realm where high-level implementations, though perhaps slower than their low-level counterparts, are fast enough to get the job done. In other words the human costs in creating problem solutions are increasingly greater than the cost of the machines that carry them out.

The second reason is less apparent; while the intelligence of human programmers in writing low level algorithms remains roughly constant over time, the intelligence of automatic code generators and optimizers moves forward monotonically. Currently, we are beginning to see examples where a few lines of high-level code evaluated by a sophisticated general-purpose interpreter perform comparably to hand written, optimized code. This occurs because optimization is accomplished at the level of the compiler, rather than on individual programs, focusing the optimization efforts of the programming community in one place, where they are leveraged together on a reusable basis.

SUMMARY OF THE INVENTION

The present invention addresses the problems outlined above by providing a code generator and multi-core framework executable in a computer system to implement the methods as disclosed herein, including a method for the code generator to automatically generate multi-threaded source code from single thread source code, and for the multi-core framework, which is a run time component, to generate multi-threaded task object code from the multi-threaded source code and to execute the multi-threaded task object code on the respective processor cores. The invention may take the form of a method, an apparatus or a computer program product.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
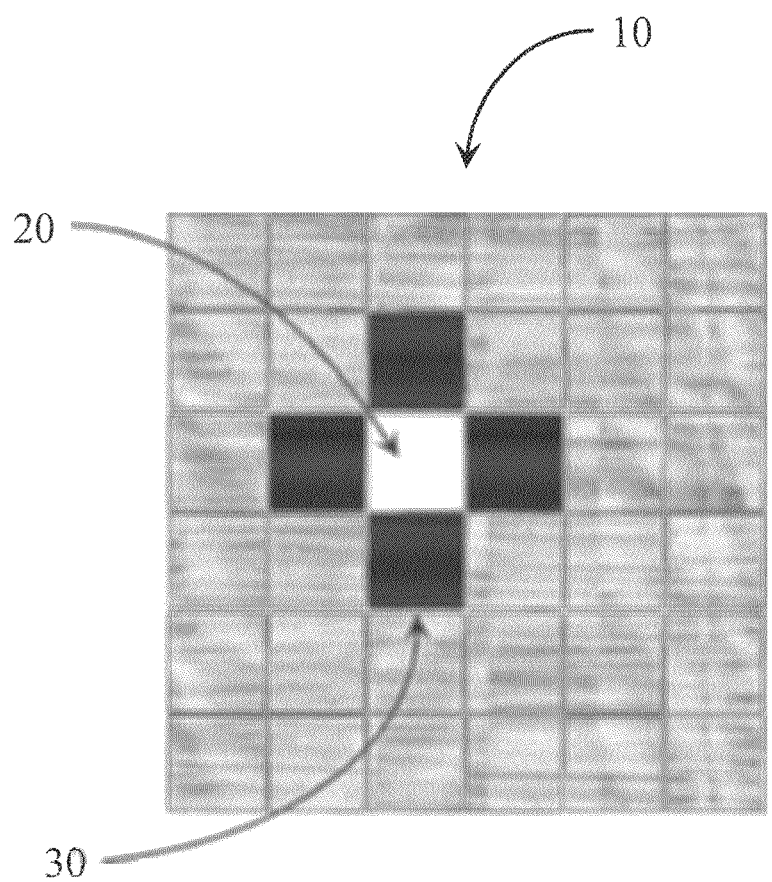
FIG. 1 is a graphic illustration of the mechanism for computation of a Jacobi Iteration (as an example of the method of an embodiment of the present invention).

The optimization results in some code generators utilized in the past were obtained using the logic programming language A-Prolog, which, may be characterized as having two distinguishing features: (i) its semantics are purely declarative, containing no commitments whatsoever regarding the data structures or algorithms underlying the execution of its programs, and (ii) the performance of the language has substantially exceeded the expectations of its designers and early users.

In light of these efforts in the past, the development of the present invention has come to recognize that it is no coincidence the two above described distinguishing features are found together in the same language. That is, it is an unexpected benefit to performance that item (i) effectively blocks programmers from optimizing their code. Though the A-Prolog programmer knows what the output of his program will be, he cannot control, or even know on a platform-independent basis, how the results will be obtained. On the other hand, it is precisely this feature which frees the hands of the compiler-designer to effect optimizations. Without constraints on the representations or algorithms deployed, the creativity of those who implement a new language can be greater. It is precisely this feature that allows them to write compilers in which concise, readable "executable specifications" can perform comparably with, or better than, handwritten algorithms.

Few other languages have taken the same path. Though their code is written at a high level of abstraction, the semantics of languages such as Haskell and Prolog make guarantees about their mechanisms of representation, computation, and inference. This approach has the advantage of allowing programmers to understand, control, and optimize the representation and execution of their programs, but in the process it ties the hands of the designers of interpreters and compilers, limiting their ability to deploy and combine optimizations at a more general level.

This situation is one of mindset resulting in a tacit agreement among the language designers who provide low level semantics and the programmers who employ the languages. Even with a high-level language such as Haskell, programmers tend to perceive, for example, the list structure, as shorthand for a particular low-level representation. They make substantial efforts to optimize their code with respect to this representation, and compiler-designers deploy optimizations in anticipation of this mindset. Thus the programming community has an implicit (and in many places explicit) commitment to viewing programming constructs as a notation for objects related to algorithms and machine architecture, even in supposedly high-level languages.

A basic premise leading to the development of the present invention is that in many problem domains it is now appropriate, or will soon be appropriate, for programmers to stop thinking about performance-related issues. This does not mean that less emphasis should be placed on the role of optimization and program performance. On the contrary, program performance is crucial for many problem domains, and always will be; and this makes it important to attack the problem by focusing efforts in places where they can be most effectively combined and reused, which is at the level of the compiler or interpreter. Then in 'ordinary' programs, the burden of optimization can be passed off to the compiler/interpreter, possibly with 'hints' from the programmer.

1. Development of the SequenceL Language

The present invention derives from the development of SequenceL, a Turing Complete, general-purpose language with a single data structure, the Sequence. The goal has been to develop a language, which allows a programmer to declare a solution in terms of the relationship between inputs and desired outputs of a program, and have the language's semantics "discover," i.e., determine, the missing procedural aspects of the solution. The key feature of the language, and therefore of the present invention, is an underlying, simple semantics termed Consume Simplify-Produce (CSP) and the Normalize-Transpose-Distribute (NTD) operation. These key features, which are set forth in detail and by example in the present application, provide the basis for the present invention.

It is still an open question exactly how far such a high level language will advance performance. It is anticipated that the performance of SequenceL can eventually equal or exceed performance of lower level languages such as C and C++ on average. In the present disclosure herein below, SequenceL and its semantics are described, and sample performance data on a commercial-scale application is provided.

The present invention focuses on SequenceL's NTD (normalize-transpose-distribute) semantic, which is envisioned as a substantial component of the performance enhancement goal. In particular, this disclosure informally explains the NTD semantic and compares it to similar constructs defined in related work. The disclosure herein also gives a formal syntax and semantics of the current version of SequenceL, including NTD, shows Turing Completeness of SequenceL, and illustrates its use with examples. Throughout this disclosure, code and other information entered by a programmer are shown in a distinct font as are traces of execution.

2. Motivating Examples and Intuition on Semantics

Iterative and recursive control structures are difficult and costly to write. In some cases these control constructs are required because the algorithm being implemented is intuitively iterative or recursive, such as with implementing Quicksort. However, most uses of iteration and recursion are not of this type. Experience has shown that in the majority of cases, control structures are used to traverse data structures in order to read from or write to their components. That is, the control structures are typically necessitated not by intuitively iterative or recursive algorithms, but by the nonscalar nature of the data structures being operated on by those algorithms. For example, consider an algorithm for instantiating variables in an arithmetic expression. The parse tree of an expression, e.g., x+(7*x)/9 can be represented by a nested list (here we use the SequenceL convention of writing list members separated by commas, enclosed in square brackets):

[x,+,[7,*,x],/,9]

To instantiate a variable, we replace all instances of the variable with its value, however deeply nested they occur in the parse tree. Instantiating the variable x with the value 3 in this example would produce

[3,+,[7,*,3],/,9]

Below is the LISP code to carry this out:

```
(defun instantiate (var val exp)
   (cond
      ( (and
         (listp exp)
         (not (equal exp nil) ) )
       (cons
          (instantiate var val (car exp) )
          (instantiate var val (cdr exp) ) ) )
   ( (equal exp var) val)
   ( t exp) ) )
```

Prolog gives a somewhat tighter solution, as follows:

```
instantiate(Var, Val, [H|T], [NewH|NewT]):-
    instantiate(Var, Val, H, NewH),
    instantiate(Var, Val, T, NewT).
instantiate(Var, Val, Var, Val).
instantiate(Var, Val, Atom, Atom).
```

Finally there is a solution in Haskell:

```
inst v val (Seq s) = Seq (map (inst v val) s)
inst (Var v) Val (Var s)
    | v==s = val
    | otherwise = (Var s)
inst var val s = s
```

It is important to note three things about this algorithm and its implementation. First, the intuitive conception of the algorithm ("replace the variable with its value wherever it appears") is trivial in the sense that it could be carried out easily by hand. Second, explicit recursion does not enter into the basic mental picture of the process (until one has been trained to think of it this way). Third, the use of recursion to traverse the data structure obscures the problem statement in the LISP, Prolog, and Haskell codes.

Often, as in this example, the programmer envisions data structures as objects, which are possibly complex, but nevertheless static. At the same time, he or she must deploy recursion or iteration to traverse these data structures one step at a time, in order to operate on their components. This creates a disconnect between the programmer's mental picture of an algorithm and the code he or she must write, making programming more difficult. SequenceL attempts to ease this part of the programmer's already-taxing mental load. The goal in the present invention is this: if the programmer envisions a computation as a single mental step, or a collection of independent steps of the same kind, then that computation should not require recursion, iteration, or other control structures. Described and shown below is code for two functions illustrating how this point can be achieved in SequenceL, and then, in the following discussion, the semantics that allow the functions to work as advertised.

Variable instantiation, discussed above, is written in SequenceL as follows:
  instantiate(scalar var,val,char)::=val when (char==var) else char The SequenceL variable instantiation solution maps intuitively to just the last two lines of the Prolog and LISP codes, and last three lines of Haskell, which express the base cases. This is the primary substance of variable instantiation, the basic picture of the algorithm. The remainder of the LISP, Haskell, and Prolog code is dedicated to traversing the breadth and depth of the tree. This is the majority of the code, line for line, and the more difficult part to write. When called on a nested data structure, SequenceL, in contrast, will traverse the structure automatically, applying the function to sub-structures of appropriate type. Furthermore, SequenceL will execute this problem solution using one simple rule, the normalize-transpose-distribute (NTD) rule. NTD is repeatedly applied to any SequenceL construct and the data upon which it operates, until the data matches the type of argument expected by the function.

A further may be seen with a matrix multiplication. The following is a Haskell version:

```
matMul::[[Integer]] -> [[Integer]] -> [[Integer]]
matMul a b = [[dotProd row col|col <-transpose b]|row <-a]
    dotProd::[Integer] -> [Integer] -> Integer
    dotProd x y = sum[s*t | s, t) <- zip x y
``` and the corresponding SequenceL:

```
mmrow(vector a, matrix b):: = dotProd(a, transpose (b))
dotProd(vector x, y):: = sum(x * y)
```

Again it is worth noting that to a first approximation, the SequenceL code can be obtained from the Haskell code by erasure of the Haskell syntax related to the traversal and composition of data structures. In particular, here SequenceL eliminates the need for "dummy variables" (i.e., row, col, s, and t, which play the role of looping variables in procedural code), as well as the comprehension and 'zip' constructs.

A couple of additional points concerning the SequenceL function warrant attention. First, a comparison of the new version of the problem solution (seen immediately above) with the old, as follows:

```
Function matmul(Consume(s_1(n,*),s_2(*,m))),Produce(next)
    where next(i,j) =
    {compose([+([*(s_1(i,*),s_2(*,j))])])}
Taking[i,j]From
    cartesian_product([gen([1,...,n]),gen([1,...,m])])
```

The function shown immediately above is a form of the SequenceL solution as previously defined. The comparison between the present solution and the older version serves as a good, representative example of the simplifications and improvements made in the language. The NTD semantics shield the programmer from having to develop much of the procedural aspect of a problem solution.

3. The Consume-Simplify-Produce (C SP) Semantics

In its present form, SequenceL has no facility for variable assignment and no input-output other than an ability to provide and inspect initial and final tableaux, respectively. Thus, SequenceL is a simple and pure functional language, capable of executing typical functional programs. For example, a recursive SequenceL solution to find the greatest common divisor appears below:
  gcd(scalar m,n)::=gcd(m−n, n) when m>n else gcd(n,m) when m<n else n A special sequence, called a tableau, provides a workspace for the evaluation of SequenceL terms. To evaluate the function, above, one establishes an initial tableau, which references the function and supplies arguments (e.g., gcd(200, 100)).

Given an initial tableau an evaluation step, called a Consume-Simplify-Produce (CSP) step is performed. A CSP step consumes_the tableau, simplifies its contents, and produces the simplified result in the next tableau. For example, a single CSP step for the gcd function is shown below:
  INITIAL=gcd(200 100)
  CSP=gcd(200−100, 100) when 200<100 else gcd(100, 200) when 200 100 else 0.100

In the example case, the simplification step simply grounds the variables of the function, leaving the grounded function body in the next tableau. The CSP in the trace so far represents one Consume-Simplify-Produce step. The subsequent CSP steps are:
  CSP gcd(200−100, 100)
  CSP==gcd(100, 100)
  CSP=gcd(10−100, 100) when 100>100 else gcd(100, 100) when 100<100 else 100
  CSP=gcd(100, 100) when 100<100 else 100
  CSP=[100]
  FINAL=[100]

The complete evaluation of gcd(200,100) is the concatenation of the Initial, the CSP, and the Final steps above. Notice that evaluation of tableaux continues until a fixpoint in evaluation is achieved.

The tableau is viewed as any other sequence in SequenceL. Sequences can be structured and contain any constants or SequenceL term, including conditional terms (i.e., function bodies). There are no restrictions on the manner in which terms can be combined. Consider the following function to check the boundaries on subscripts:

sub(?x,scalar i)::=x(i when i>=1 and i=<length(x) else subscript_error)

The parameters in the function signatures are typed according to dimension or level of nesting. Types include scalar, vector, vector(vector), etc. The type ? specifies an argument of any dimension. Given an initial tableau of sub([12, 3, 4, 5], 3), CSP steps lead to x(3) or [12, 3, 4, 5](3), which ultimately produces 4. The complete set of evaluation steps are:

INITIAL=sub([[12, 3, 4, 5], 3])
CSP=[12, 3, 4, 5](3 when (3>=1) and (3=<size([12, 3, 4, 5])) else subscript_error)
CSP=[12, 3, 4, 5](3 when true else subscript_error)
CSP=[12, 3, 4, 5](3)
CSP=4
FINAL=[4]

Notice that sub([10,20,30,40],7) leads to [10,20,30,40] (subscript_error).

4. Normalize-Transpose-Distribute (NTD) Semantics and Overtyping

The Normalize-Transpose-Distribute semantics are based upon the idea of overtyping. Overtyping occurs when an operator or function encounters operands or arguments that are of higher level of nesting (or dimension) than expected. For example, arithmetic operators are defined to operate on scalars. Therefore the sequence [2+2] gives the expected result, 4. If the expression [1,2,3]*2 is to be evaluated, the following CSP steps are followed:

$$\text{INITIAL} = [1, 2, 3] * 2 \; ntd$$

$$CSP = [[1*2], [2*2], [3*2]]$$

$$CSP = [2, 4, 6]$$

$$FINAL = [2, 4, 6]$$

Since the multiply also expects scalars, a NTD is performed as the simplification step of the CSP. The NTD includes a normalize, which makes 3 copies of the scalar 2, since the nonscalar argument has 3 elements. This results in [1,2,3]*[2,2,2]. A transpose on the arguments is performed, resulting in [[1,2],[2,2],[2,3]]. Now the operator can be distributed among the binary scalars, resulting in [[1*2], [2*2], [3*2]], which supplies the multiplication operator the scalar operands for which it is defined. The final CSP step above obtains the desired product.

Overtyping exists anytime an operator has operands greater than the expected nesting level. In the example above the multiplication operator was overtyped by 1 level (i.e., one of the operands was a one-dimensional sequence of scalars, rather than a scalar as expected). Consider the situation when the plus operator acts on a three-dimensional sequence. In cases such as this, the NTD and the CSP interact in a manner resulting in nested NTDs.

INITIAL=[[[1, 1, 1], [2, 2, 2]], [[11, 11, 11], [12, 12, 12]]]+[[[1, 1, 1], [2, 2, 2]], [[11, 11, 11], [12, 12, 12]]]
CSP=[[[[1, 1, 1], [2, 2, 2]]+[[1, 1, 1], [2, 2, 2]]], [[[11, 11, 11], [12, 12, 12]]+[[11, 11, 11], [12, 12, 12]]]]
CSP=[[[[1, 1, 1]+[1, 1, 1]], [[2, 2, 2]+[2, 2, 2]]], [[[11, 11, 11]+[11, 11, 11]], [[12, 12, 12]+[12, 12, 12]]]]
CSP=[[[1+1, 1+1, 1+1], [2+2, 2+2, 2+2]], [[11+11, 11+11, 11+11], [12+12, 12+12, 12+12]]]
CSP=[[[2, 2, 2], [4, 4, 4]], [[22, 22, 22], [24, 24, 24]]]
FINAL=[[[2, 2, 2], [4, 4, 4]], [[22, 22, 22], [24, 24, 24]]]

The interaction of CSP and NTD in this trace results in adding corresponding elements of two three-dimensional structures.

When operators and functions are defined in SequenceL, type information is provided. The types indicate the dimension of an argument. The question mark ?, the words scalar, vector, vector(vector) or matrix, vector(matrix), etc. in function signatures indicate the type of structure the function expects. A question mark allows any structure, a scalar is order zero, a vector order one, a vector(vector) or matrix is order two, etc. For a parameter P, in a function's signature and a corresponding argument A, the following Table 1A indicates the conditions under which A is overtyped, based on the order of A:

TABLE 1A

| P's type | P's order | A's order |
|---|---|---|
| scalar | 0 | order(A) > 0 |
| vector | 1 | order(A) > 1 |
| vector(vector) | 2 | order(A) > 2 |

If P is typed with the ? then A's order can be any ≥0 (i.e., there is no situation in which A is overtyped). A vector(vector) can be a vector containing a mixture of scalars and at least one vector or the special case matrix. An undertyped argument, or error, occurs whenever:

TABLE 1B

| P's type | P's order | A's order |
|---|---|---|
| vector | 1 | order(A) < 1 |
| matrix | 2 | order(A) < 2 |
| vector(matrix) | 3 | order(A) < 3 |

When provided arguments of the order declared, a function or operator is evaluated. When provided an overtyped argument, NTDs result. When provided an undertyped argument, a type error occurs. The following discussion provides an informal definition of the NTD semantics and more advanced examples of its effect.

5. Simple Translation Involving Normalize-Transpose-Distribute

Presented here are informal definitions of the NTD semantics, which enable the shortcuts seen above, in more detail. First defined are the NTD operations on sequences ("sequences" are be defined more precisely herein below but for now can be thought of as ordered multisets). Let E be a sequence of length L, and for i≤L let E(i) denote the i'th member of E. Let S be a subset of {1, . . . , L}, and for all i in S suppose E(i) are sequences of the same length L' (though E may contain other sequences of similar length, not in S). For any natural number n and any e, let repeat(e,n) denote the ordered multiset consisting of n copies of e. From E, we obtain the normalization of E with respect to S, denoted by, normalize(E,S), by replacing E(i) with repeat(E(i),L') for all i not in S, and leaving E(j)_unchanged for i in S. Intuitively, normalization is used to make all the arguments conformant in terms of number of elements. For example:

normalize([[1,2], [2,3,4],5], {1})=[[1,2], [[2,3,4], [2,3,4]], [5,5]]

The second and third members of the original sequence are repeated twice each, because the length of the first member, with respect to which we are normalizing, is 2. For another example, normalize([[1,2, 3, [4,5], [6,7]], {1,4})=[[1,2], [3,3], [[4, 5], [4,5]], [6,7]]

For any sequence E whose members are sequences of the same length, the transpose of E consists of a sequence of all the first components of members of E, followed by a sequence of all the second components, etc. For example, transpose([[1,2,3],[10,20,30]])=[[1,10],[2,20],[3,30]]

Finally, the distribution of an operation over a sequence is obtained by applying the operation to each member of the sequence (this is often called a map). For example, distribute(f, [1,2,3])=[f(1),f(2),f(3)]

The Order of a SequenceL term is its level of nesting (scalars are of Order 0, denoted by 0 in the SequenceL function signatures; vectors are of Order 1, denoted by 1; matrices are of Order 2, denoted by 2; etc.). Any order can be accepted for a parameter given Order ?. Arguments of a SequenceL expression which are of higher order than indicated in the function signature are called overtyped arguments, and those whose order exceeds the expected order by a maximal amount (i.e., maximal among the parameters in the expression) are referred to as maximally overtyped. For example, both arguments of the expression [1,2]+[[3,4],[5,6]] are overtyped, and the second argument is maximally overtyped. The key feature of SequenceL semantics, eliminating the need for control structures in many cases, is this: whenever any argument of an expression is of an order greater than that required by the function signature, the argument is normalized with respect to the collection of arguments which are maximally overtyped. The argument is then transposed, and the operation is distributed over the resulting sequence. This process continues recursively (through a succession of CSP's) until a base case is reached, in which the function or operator can be applied directly to its arguments.

It turns out that this simple semantics adjustment allows operators to locate and act on their intended arguments within a data structure, and synthesize the results into a new data structure, in a way that is both intuitive and flexible.

For example, in the base case, the infix + and * operators act in the usual way:

3+10=13

3*10=30

Through repeated, implicit applications of NTD, we can multiply a vector by a scalar using the ordinary * operation:

10 * [1, 2, 3]

(normalize) → [[10, 10, 10], [1, 2, 3]]

(transpose) → [[10, 1], [10, 2], [10, 3]]

(distribute) → [[10 * 1], [10 * 2], [10 * 3]]

→ [10, 20, 30]

The same process can be applied to add vectors. The programmer simply writes, for example, [1,2,3]+[10,20,30], which evaluates as follows:

(normalize) → [[1, 2, 3], [10, 20, 30]]

(transpose) → [[1, 10], [2, 20], [3, 30]]

(distribute) → [[1 + 10], [2 + 20], [3 + 30]]

→ [11, 22, 33]

This works not because vector arithmetic is built into SequenceL, but because the usual operators scale up naturally by way of NTD.

NTDs also scale up to user-defined functions. One declares expected dimensions for function parameters in the function signature. For example, an identity function, ident2 (matrix n)::=n is defined with a two-dimensional sequence for its argument. When provided a three-dimensional sequence to evaluate one NTD is performed:

Initial = $ident2$([[[1, 1, 1], [2, 2, 2], [

3, 3, 3]], [[11, 11, 11], [12, 12, 12], [13, 13, 13]]])

CSP = [$ident2$([[1, 1, 1], [2, 2, 2], [3, 3, 3]]), $inden2$([[11, 11, 11], [12, 12, 12], [13, 13, 13]])]

Final = [[[1, 1, 1], [2, 2, 2], [3, 3, 3]],

[[11, 11, 11], [12, 12, 12], [13, 13, 13]]]

Modifying the function to expect one-dimensional sequences ident1(vector n)::=n, and providing the same three-dimensional argument, results in nested NTDs in two CSP steps. The first two steps and the final result are identical to the trace above. Only the non-italicized step below showing the nested NTD differs from the ident2 trace.

Initial = $ident1$([[[1, 1, 1], [2, 2, 2], [3, 3, 3]], [[11, 11, 11], [12, 12, 12], [13, 13, 13]]])

CSP = [$ident1$([[1, 1, 1], [2, 2, 2], [3, 3, 3]]), $ident1$([[11, 11, 11], [12, 12, 12], [13, 13, 13]])]

CSP = [[$ident1$([1, 1, 1]), $ident1$([2, 2, 2]), $indent1$([3, 3, 3])], [$indent1$([11, 11, 11]), $indent1$([12, 12, 12]), $indent1$([13, 13, 13])]]

Final = [[[1, 1, 1].[2, 2, 2], [3, 3, 3]], [[11, 11,

11], [12, 12, 12], [13, 13, 13]]]

Modifying the function to expect scalar sequences ident0 (scalar n)::=n, and providing the same three-dimensional arguments, results in an additional nested NTD. Only the non-italicized step indicating the additional NTD varies from the ident1 trace above.

Initial=ident0([[[1, 1, 1], [2, 2, 2], [3, 3, 3]], [[11, 11, 11], [12, 12, 12], [13, 13, 13]]])

CSP=[ident0([[1, 1, 1], [2, 2, 2], [3, 3, 3]]), ident0([[11, 11, 11], [12, 12, 12], [13, 13, 13]])]

CSP=[[ident0([1, 1, 1]), ident0([2, 2, 2]), ident0([3, 3, 3])], [ident0([11, 11, 11]), ident0([12, 12, 12]), ident0([13, 13, 13])]]

CSP=[[[ident0(1), ident0(1), ident0(1)], [ident0(2), ident0 (2), ident0(2)], [ident0(3), ident0(3), ident0(3)]],

[[ident0(11), ident0(11), ident0(11)], [ident0(12), ident0(12), ident0(12)], [ident0(13), ident0(13), ident0(13)]]]

Final=[[[1, 1, 1], [2, 2, 2], [3, 3, 3]], [[11, 11, 11], [12, 12, 12], [13, 13, 13]]]

All of the identity functions, ident2, ident1, and indent0 gradually pull the nonscalars apart in a logical fashion and furthermore, put the nonscalars back together again. These are simple demonstrations of the power of the NTD combined with the CSP. Operations could have been performed at any level of dissection with an assurance that the nonscalar would reform in subsequent CSP steps. The NTD/CSP an be used to perform operations on dissected structures in an orderly manner.

A further demonstration of the semantics working (in lieu of the programmer), can be seen in an evaluation of the variable instantiation code mentioned above. Recall the code:

instantiate(scalar var,val,char)::=val when (char==var) else char

In the case of a user-defined function, like instantiate, the user has indicated that the three arguments var, val, and char are scalars. Thus the function, as written, expresses only the base case in which a single character is instantiated. However, as in the above examples, this function will automatically "scale up" to handle arbitrarily deeply nested expressions. For example, suppose the function is called with arguments x, 3, and [x, +,[[7,*,x],/,9]]:

instantiate(x,3,[x,+,[[7,*,x],/,9]])

Since the third argument char expects a scalar, but has been given a list of length 3, the other two arguments are normalized to obtain: [x,x,x], [3,3,3], [x,+,[[7,*,x],/,9]]. The results are then transposed, and the operation distributed among the resulting sequences, resulting in 3 function references, which may be evaluated in parallel (writing ins for instantiate):

[ins(x,3,+) ins(x,3,+), ins(x,3,[[7,*,x],/,9])]

The above step is hidden from the user and is a result of the internals of the language translator. The first two subterms are now ready for evaluation. The third subterm, since its final argument is of greater order than expected by the function, undergoes two more rounds of NTD, obtaining:

[[ins(s,3, 7),ins(x,3,*),ins(x,3,x)],ins(x,3,/)ins(x,3,9)]

It can be seen that the repeated use of normalize-transpose-distribute in successive CSP steps allows the function to descend implicitly through the data structure, "finding" its appropriate arguments without any additional effort from the programmer. It can also be seen that the actual computations in one part of the evaluation may proceed in parallel with additional applications of NTD in other parts.

At this point the arguments match what the function expects, and can therefore be evaluated based on the user's specification of the function body, leading to the final, desired result:

[3,+,[[7,*,3],/,9]]

The execution of the function descends recursively into the tree, and is essentially similar to the execution of the LISP, Haskell, or Prolog versions presented earlier, but in SequenceL the recursion falls automatically out of the semantics and is not explicit in the source code. As in this example, the internal workings of the normalize-transpose-distribute semantics can be fairly complex. However, the effect on code and its output is generally natural and intuitive, and often corresponds to simply omitting iterative and recursive constructs that would otherwise be needed.

The advantage SequenceL brings in the present case is not a matter of smaller codes but a reduction in the time devoted to designing and debugging loops and recursive functions. To do this the programmer must learn and master the appropriate constructs (Haskell has several: comprehension, map, zip, zipWith, zipWith2, . . . , zipWith7, filter, etc.), and then apply them in the correct configuration with respect to order and nesting. These configurations are often greatly constrained, or even determined, by the structure of the data along with the input and output types of the operators used. Thus, the use of control structures is not as flexible as it first appears as they are often derived rather than chosen. For the human programmer, this derivation is taxing and error prone. SequenceL, by contrast, often yields the derivation automatically through NTD.

Not all instances of recursion can be eliminated, or need to be. As noted above, some algorithms are most naturally thought of and coded in this manner, and SequenceL allows arbitrary recursion when needed. However, the use of iteration or recursion merely to traverse and synthesize data structures, which includes the majority of cases, is a distracting and sometimes cumbersome process. In many cases, SequenceL relieves this nuisance, allowing the programmer to write code closer to his or her mental picture of the problem solution. SequenceL's implicit normalization and transpose evaluation steps significantly diminish the need for iteration and recursion. In particular, recursion is typically not needed in SequenceL and is replaced by iterative operations implicit in the SequenceL code. These iterative operations could be performed in parallel (whether they are actually performed in parallel or not). By analogy with Haskell, this includes all recursive patterns covered by zip, map, and list comprehension, but not those covered by foldr and foldl. NTD also covers some cases, which are not covered by any of the standard Haskell constructs, as discussed herein below.

6. Examples Run Using the SequenceL Interpreter

The goal of the SequenceL effort is to reduce the programmer's obligation to specify the procedural part of a problem solution. In this section we focus on how SequenceL applies to different kinds of problems. As described above, the semantics of SequenceL are given as a theory of first order logic. Building on the informal definitions presented above, one may view the complete "evaluation" of a SequenceL expression T1 to be a series of Tableaux:

T1 T2= . . . =Tn where Ti=Ti+1 is a theorem of Meta-SequenceL for $1 \le i \le n$, and Tn is a term written using only scalars, commas, and square brackets. A SequenceL interpreter, which generates these theorems, is the source of all the traces shown herein below and was used to evaluate all of the examples herein. For purposes of this discussion each Ti will be referred to as a Tableau, as above wherein an overview of the CSP was provided.

a. Matrix Multiplication

NTD is first demonstrated on matrix computations. The SequenceL mmrow and dp functions from above are used. The mmrow function computes the matrix product of a vector and a matrix, while dp computes the dot product of two vectors.

mmrow(vector a, matrix b)::=dp(a,transpose(b))
and
dp(vector x,y)::=sum(x*y)
Given the matrix, $$M1 = \begin{bmatrix} 1 & 2 & 4 \\ 10 & 20 & 40 \\ 11 & 12 & 14 \end{bmatrix}$$

An initial tableau for matrix multiply is:
mmrow(M1, M1) (1)
It is noted that mmrow's first argument is expected to be of order 1. Thus, the three constituent rows making up M1 are identified:

$R1: \langle 1 \quad 2 \quad 4 \rangle$ $R2: \langle 10 \quad 20 \quad 40 \rangle$ $R3: \langle 11 \quad 12 \quad 14 \rangle$ Normalize then makes three copies of the second matrix:
mmrow([R1, R2, R3], [M1, M1, M1]) (2)
and transpose and distribute yield the next tableau:
(mmrow(R1, M1), mmrow(R2, M1), mmrow(R3, M1)) (3)
Now the language interpreter instantiates the body of the mmrow function;

$$\begin{bmatrix} dp(R1, \text{transpose}(M1)), \\ dp(R2, \text{transpose}(M1)), \\ dp(R3, \text{transpose}(M1)) \end{bmatrix} \quad (4)$$

Next true matrix transposes are performed forming $M1^T$ where:

$$M1^T = \begin{bmatrix} 1 & 10 & 11 \\ 2 & 20 & 12 \\ 4 & 40 & 14 \end{bmatrix}$$

After the transposes, the dp functions are eligible for evaluation:

$$\begin{bmatrix} dp(R1, M1T), \\ dp(R2, M1T), \\ dp(R3, M1T), \end{bmatrix} \quad (5)$$

The dp function takes two order-1 sequences as input, but in (5) above, the second argument of each dp reference is a two-dimensional structure. Thus, we note the rows of the transposed M1:

$R1: \langle 1 \quad 10 \quad 11 \rangle$ $R2: \langle 2 \quad 20 \quad 12 \rangle$ $R3: \langle 4 \quad 40 \quad 14 \rangle$ Therefore, another NTD is performed on each dp resulting in 9 dp references:

$$\begin{bmatrix} [dp(R1, R1'), dp(R1, R2'), dp(R1, R3')], \\ [dp(R2, R1'), dp(R2, R2'), dp(R2, R3')], \\ [dp(R3, R1'), dp(R3, R2'), dp(R3, R3')] \end{bmatrix} \quad (6)$$

At this point, the dp functions are instantiated and operator level NTDs distribute operators to produce the final result:

[[65, 90, 140], [650, 900, 1400], [285, 430 720]] (7)

The procedural aspects of Matrix Multiplication are fully discovered through the NTD. Furthermore, examination of the SequenceL trace reveals opportunities for parallel evaluations, which can lead to design decisions in developing concurrent codes. These traces can be used to discover improved concurrent algorithms to be implemented in JAVA.

Two observations are important in reviewing this trace:

(i) Parallel computations are a result of the evaluation automatically decomposing the operand sequences. This is the significant distinction between SequenceL's evaluation R1'=(1 10 11) R2'=(2 20 12) R3'=(4 40 14) strategy when compared with competitors like dataflow machines. In a dataflow machine, the programmer must decompose the data structures, resulting in more complicated functions, ones the programmer must write. See, for example, the pH matrix multiply immediately following below.

(ii) The programmer did nothing to indicate where the parallel or iterative/recursive elements of the computation exist. These are found automatically via NTDs as the function and operations are evaluated according to the SequenceL semantics.

In pH (a dialect of parallel Haskell) functions to multiply two two-dimensional matrices are shown here:

row $i$ $x =$ let $((li, lj), (ui, uj)) = $ bounds $x$ fill $k = x!(i, k)$ in $mkArray(lj, uj)$ fill col $j$ $x = $ let $((li, lj), (ui, uj)) = $ bounds $x$ fill $k = x!(k, j)$ in $mkArray(lj, uj)$ fill ip ar bc k1 k2 = let $s =$ 0.0 in for $k < -(k1 \ldots k2)$ do next $s = s + ar!k * bc!k$ finally $s$ matmul $a$ $b$ = let $((1, 1), (m, n)) =$ bounds $a$ $((1, 1), (\_, 1)) = $ bounds $b$ fill $(i, j) =$ ip (row $i$ $a$) (col $j$ $b$)1 $n$ in mk Array$((1, 1), (m, 1))$ fill Even though there are no directives to indicate parallel processing opportunities, it is incumbent upon the programmer to break the matrices apart. The parallelisms are only then discoverable.

b. Jacobi Iteration

A more complex matrix computation involves the Jacobi Iteration solution of a Partial Differential Equation according to the discretized formula:

$\mu j,k' = \frac{1}{4}(\mu j+1,k+\mu j-1,k+\mu j,k+1+\mu j,k-1)-(\rho j,k \cdot (1;4\Delta^2))$ An important difference between Jacobi and Matrix Multiplication is that, in Jacobi, the computed value of a matrix element involves only its four neighbors: above, below, and to each side. (This is seen schematically with matrix 10 in FIG. 1.) Therefore, one must be able to select the appropriate values to compute the new value in an interior position. For example, to compute the (3,3) element (the lightened box 20 in FIG. 1), the darkened boxes 30 must be used as indicated in the equation above. To select the darkened elements requires a capability to call out row and column indices, much the way the taking clause did in the prior versions of SequenceL (see comparison made above). Here is one SequenceL solution to compute one iteration, defining the next matrix μ'.

```
jacobi (matrix a, scalar delta, matrix b) : :=
    neighbors ( [1..length (a) ] , a, transpose(a) ) – (b* (delta^ 2) ) / 4]
neighbors (scalar i, vector a, matrix b) : :=
    helper (a,b,i, [1..length (b) ] )
helper (vector a,b scalar i,j) : :=
    a (j) when        (i=1 or length (a) =i) or
                      (j=1 or length (a) =j)
    else
    a (i+1) + a (i–1) + b (j+1) + b (j–1) / 4
```

In the SequenceL solution, each of the rows is combined with each of the columns, with neighbors playing the role of the mmrows function of matrix multiply and helper playing the role of dp. Besides forming the desired Cartesian product of the row-order and column-order versions of the input matrix, the NTD also captures the row indices in neighbors, and the column indices in helper. Ultimately, there is a point in the resulting trace where each row/column combination is applied to helper with its respective subscripts. To consider the neighbors and helper functions, assume M1 and its transpose $M1^T$ as previously defined for the matrix multiply example:

$$M1 = \begin{matrix} R1: \\ R2: \\ R3: \end{matrix} \begin{bmatrix} 1 & 2 & 4 \\ 10 & 20 & 40 \\ 11 & 12 & 14 \end{bmatrix} \quad M1^T = \begin{matrix} R1: \\ R2: \\ R3: \end{matrix} \begin{bmatrix} 1 & 10 & 11 \\ 2 & 20 & 12 \\ 4 & 40 & 14 \end{bmatrix}$$

And let R1, R2, and R3 be the rows of M1, and R1', R2', and R3' be the rows of $M1^T$. When neighbors is referenced in jacobi, it includes arguments providing the subscripts of all the rows, via the generative [1 . . . length(M1)], and all rows and all columns of the matrix a:

neighbors([1,2,3]. M1, $M1^T$)

NTDs result in pairing each row and its respective subscript with all of the columns:

[neighbors(1,R1,$M1^T$),
neighbors(2,R2,$M1^T$),
neighbors(3,R3,$M1^T$)]

Likewise the interaction between neighbors and helper combine each row and its respective subscript with each column and its respective subscript, resulting in:

[[helper(R1,R1',1,1),
helper(R1,R2',1,2),
helper(R1,R3',1,3)],
[helper(R2,R1',2,1),
helper(R2,R2',2,2),
helper(R2,R3',2,3)],
[helper(R3,R1',3,1),
helper(R3, R2',3,2),
helper(R3, R3',3,3)]]

Only the second row, second column element fails to meet the condition of the when clause. This results in the average value of its neighbors above and below, and to the left and the right. The helpers produce each element of the matrix. As a result of a sequence of NTDs in the evaluation of the jacobi function, all elements of the matrix produced by neighbors are subtracted from corresponding elements of the rho matrix. The rho matrix is computed as a result of a series of NTDs in the subexpression of the jacobi function pj,k·(¼Δ²)), culminating in the final result:

$$\begin{bmatrix} [0.999958, 1.99992, 3.99983], \\ [9.99958, 15.9992, 39.9983], \\ [10.9995, 11.9995, 13.9994] \end{bmatrix}$$

The trouble with the forgoing solution to Jacobi iteration is that one must know about and skillfully deploy the NTD semantics to solve the problem. Such requisite knowledge is counterproductive to the purpose of shielding the user from technical details in a problem solution. Consequently, with virtually no change to the SequenceL syntax, the present invention has introduced the concept of variable subscripts whose values are computed rather than obtained as function arguments. The concept is similar in some respects to the polynomial time backtracking one can set up for assertional databases in Prolog.

The prior definition of Jacobi in SequenceL produces the Cartesian product via the nested NTDs, which also produced the needed subscripts. In other words, nested NTDs can produce the desired combination of subscript pairs defined by a Cartesian product. The NTD semantics combine respective elements of operand sequences and side-step the need to provide subscripts when their only purpose is to break apart and rebuild a nonscalar. There are times, however, when subscripts are a natural part of the problem solution. For example, recall the necessary use of subscripts in the Jacobi equation shown above and repeated here:

μj,k'=¼(μj+1,k+μj–1,k+μj,k+1+μj,k–1)–(ρj,k·(¼Δ²))

Free variable subscripts in SequenceL range over the sizes of structures they subscript and operate in a manner similar to the evaluation of free variables in Prolog. When more than one free variable is specified, nested NTDs produce the Cartesian product of subscript values. With the use of free variables, the complete Jacobi solution in SequenceL is improved and closely matches the specifying equation:

$jacobi_{j,k}$(matrix $a$, scalar delta):: =

$a(j,k)$ when $(j = 1$ or length$(a) = j)$ or $(k = 1$ or length$(a) = k)$ else $((a(j+1, k) + a(j-1, k) + a(j, k+1) + a(j, k-1))/4) -$ $(a(j, k) * \text{delta}^\wedge 2)/4$ Likewise, matrix multiply is improved:

matmul$_{i,j}$(matrix m1, m2)::=sum(m1(i,all)*m2(all,j))

There are times when subscripts are part of the basic concept of a problem solution as they are in the definition of Jacobi Iteration and Matrix Multiplication. The programmer can identify and provide these natural uses of subscripts, while leaving it to the NTD semantics to handle their processing. When subscripts are not a natural feature of a specification, but instead, are required in the iterative framework specifying how to solve a problem, the subscripts and their management is handled by the NTD semantics. An example of a subscript, absent in the SequenceL Matrix Multiplication, is the extra subscript (k in the example below) which is required by procedural definitions:

```
For i := 0 To rows do
    begin
    For j := 0 To cols do
        begin
```

```
                val := 0;
                For k := 0 To cols do
                begin
                    val := val + (m1[i, k] * m2[k, j]) ;
                end;
                mm[i, j] := val;
            end;
        end;
``` c. Fast Fourier Transforms

The previous examples demonstrate how one declares intuitive solutions in SequenceL and the manner in which the NTD effectively discovers the procedural aspects of algorithms. The Discrete Fast Fourier Transform follows this trend as well. A Discrete FFT involves two computations defined by:

$a(\omega^j)$=fft(odd elements of a)+fft(even elements of a)·$\omega^{2j}$ $a(\omega^{j+N})$=fft(odd elements of a)−fft(even elements of a)·$\omega^{2j}$ where $0 \leq j \leq N-1$ In the following SequenceL FFT definition *c, /c, ^ce, and ^c are complex multiply, divide, e raised to a complex number, and a complex number raised to a real number, respectively.

```
fft (scalar pi2,e,n matrix a) : :=
    fft (pi2,n/2,a( ([1..n/2] *2−1) ) +
    fft (pi2, n/2,a( ([1..n/2] *2) ) *c
    (e,0) ^ce ( (0,pi2) /c (n,0) ) ^c ( ([0..n/2−1] ,0)
    ++
    fft (pi2,n/2,a ( ([1..n/2] *2−1) ) −
    fft (pi2, n/2,a ( ([1..n/2] *2) ) *c
    (e, 0) ^ce ( (0,pi2) /c (n,0) ) ^c ( ([0..n/2−1] ,0)
        when length (a) > 1
            else
            a (1)
```

It is worth characterizing the subexpressions appearing in the solution and their relationship to the FFT definition. One term of the mathematical definition of FFT is $\omega = e^{(2\pi i) \div N}$. In SequenceL this is obtained by:

[2.718280]^ce([0,pi2]/c[n,0]),  (A)

where pi2 is instantiated with the argument 6.283185, which is 2n, ^ce is complex exponentiation, and /c is complex division.

When a is subscripted a([1 ... n/2]*2−1), where n is the size of a. (B)

NTDs on the multiplication and then the subtraction operator yields a vector of the odd-numbered elements of a. The even vector is obtained in a similar SequenceL operation:

a([1 ... n/2]*2), where n is the size of a. (C)

The Fast Fourier Transform is now definable recursively, where two sets of values are obtained by the equations (employing the expressions A, B, and C, above):

$a(\omega^j)$=fft(B)+fft(C)·$A^{2j}$ $\omega(\omega^{j+N})$=fft(B)−fft(C)·$A^{2j}$ where $0 \leq j \leq N-1$ which leads to the SequenceL definition given previously. Procedural aspects of these two equations are discovered and handled by the NTD.

d. Gaussian Elimination

A further example problem that may be considered is Forward Processing in Gaussian Elimination. Our first SequenceL definition of Gaussian elimination is:

gauss(matrix e, scalar i)::=e when length(e)=1 else e(1)++ gauss(ztail(tail(e), e(1)i),i+1)

ztail(vector e2,e1, scalar i)::=e2−(e1*e2(i))/e1(i)

A example of the matrix parameter e for the Gaussian Function follows:

eq1=(1, −3, −2, 6)
eq2=(2, −4, 2, 18)
eq3=(−3, 8, 9, −9)

Parameter i selects an equation as the basis for processing. The function ztail performs the most significant computations. It returns the matrix obtained by subtracting an appropriate multiple of e1 from each row of e2, giving all 0's in the ith column. NTDs accomplish a considerable amount of the work. For example a typical call to ztail is made with respective parameters of a matrix M, vector v, and scalars:

ztail(M, v, s)

An NTD is performed because the first argument is overtyped, resulting in $$\begin{bmatrix} ztail(M(1), v, s), \\ ztail(M(2), v, s), \\ \ldots, \\ ztail(M(k), v, s) \end{bmatrix}$$

where k is the number of rows of M. Instantiation of the body of ztail now gives $$\begin{bmatrix} M(1) - (v*M(1, s))/v(s), \\ M(2) - (v*M(2, s))/v(s), \\ \ldots, \\ M(k) - (v*M(k, s))/v(s) \end{bmatrix}$$

Since the operations −, *, / and/act on scalars and the arguments shown in bold are vectors, another round of NTD occurs, resulting finally in the matrix $$\begin{bmatrix} \begin{bmatrix} M(1, 1) - (v(1)*M(1, s))/v(s), \\ M(1, 2) - (v(2)*M(1, s))/v(s), \ldots \end{bmatrix} \\ \begin{bmatrix} M(2, 1) - (v(1)*M(2, s))/v(s), \\ M(2, 2) - (v(2)*M(2, s))/v(s), \ldots \end{bmatrix} \\ \ldots, \\ \begin{bmatrix} M(k, 1) - (v(1)*M(k, s))/v(s), \\ M(k, 2) - (v(2)*M(k, s))/v(s), \ldots \end{bmatrix} \end{bmatrix}$$

The complex pattern of subscripts to M and v appearing above reflects the thought pattern behind the design of the Pascal and NESL versions of the ztail function that follow:

```
function ztail (eq:matrix;r,c:integer) :matrix;
/*r is the number of equations and c is the number of
coefficients */
    var m:integer;
    begin
    i:=1;
    for j:=i+1 to r do
        begin
        m:=eq[j,i] ;
        for k:=1 to c do
            eq[j,k] :=eq[j,k] − ( (eq[i,k]*m) / eq[i,i])
        end;
    return eq
    end;
```

Apart from the complexity of establishing the nested iterative control structures, care must be taken to manage the subscripts of the matrix containing the equations. Managing the interaction of the control structures and the subscripts provides a mental burden for the programmer, distracting him or her with technical details that tend to distract one from efforts to focus on the essence of the problem solution. The only subscript in the SequenceL ztail function identifies the row of coefficients being processed, which is a natural part of the intuitive picture of the problem solution. The additional subscripts in the Pascal-like solution above and the NESL solution below are the technical distractions arising from the more algorithmic detail involved in stating the how of the solution.

There is a slight improvement (over the Pascal version) in the NESL version, which uses list comprehension. Note however that the NESL solution still requires programmer effort to manage subscripts and the nested application of subscripts is not unlike the nested for-loops above:

```
ztail(eq,i)=
{ {eq[j][k]-eq[i][k]*eq[j][i]/eq[i][i]
:k in [1:#eq[1]]
}
: j in [1:#eq]
};
```

The thought process behind the SequenceL codes deploying NTD downplays the numerical subscripts required by the Pascal and NESL solutions, and corresponds to a more visual-spatial picture of how the final matrix is formed. This reflects the previous discussion above concerning the natural and unnatural use of subscripts. In the case of the ztail function the unnecessary subscripts are not even present in the SequenceL solution, not to mention the iterative or recursive scaffolding required to process them. In the case of the free variable version of the jacobi function, subscripts that are a natural part of the problem solution are visible, but once again the control structures required to manage them are not.

A common optimization in Gaussian Elimination is pivoting, in which the matrix of coefficients is rearranged to prevent the potential for division by zero. Using the built-in operator for set difference (i.e., the \), SequenceL pivoting can be accomplished by two helper functions:

```
pivot (matrix coef, scalar j) : :=
    [max(coef, j) ] ++ coef \ max (coef, j)
        when length (coef)>1 else coef
    maxI(matrix coef, scalar j) ::= coef (I) when
    and(abs(coef (I,j)) > = abs (coef (all,j) ) )
```

There is no change to ztail, and a minor one to Gaussian to take care of the pivoting:
gauss(matrix e, scalar i)::=e when length(e)=1 else e(1)++
    gauss(ztail(pivot(tail(e),i), e(1) i)), i+1
e. Quicksort As a further example it is recalled that Quicksort is pivot-based. A pivot is selected from a list to be sorted; all items less than the pivot are placed in front of it; and all items greater than the pivot are placed after (++ denotes an append operation).
    quick(vector a)::=
        a when length(a)<=1 else
        quick(less(a,a(length(a) div 2)))++
        equal(a,a(length(a) div 2))++
        quick(great(a,a(length(a) div 2)))

The SequenceL functions for identifying elements less than, equal, and those that are greater than the pivot are intuitive and rely on NTDs to break apart data structures for the desired comparisons:

| less (scalar a,b) | : := a when a < b |
| equal (scalar a,b) | : := a when a = b |
| great (scalar a,b) | : := a when a > b |

For example, given the initial tableau, less([5, 7, 2, 9], 7), NTDs result in:
    [less (5, 7), less (7, 7), less, (2, 7), less, (9, 7)]
Since only the tuples containing arguments 2 and 5 satisfy the comparison, they are the only references to less returning values. The final result is:
    [5,2]
Here is the NESL solution:

```
function Quicksort(A)=
    if (#A <= 1) then A
    else
        let     b = S[rand(#S)];
                S1 = {e in A|e<b}
                S2 = {e in A|e>b}
                R = {Quicksort(v); v in[S1,S2)]};
        in R[0] ++ [e] ++ R[1];
```

NESL's comprehension construct ({<var> in <sequence>|<condition>}) distributes the elements of a referenced set among an operator. The NTD generalizes this concept, and is the only semantics required of SequenceL beyond the grounding of function parameters and the evaluation of built-in operators.

Note that the Quicksort in SequenceL, though written in a functional syntax, truly is an algorithm in the sense that it is devised to execute quickly as opposed to simply being declared to deliver a specified result. A more declarative sort might be written as follows:
    Sort(vector List):=S where
    bag_equal(List,S) %
    S(1)<= . . . <=S(|S|)
In this code, bag_equal is a Boolean function which returns 'true' if its arguments are lists which are equal as bags (i.e., multisets), and the ellipsis operator ' . . . ', acts with infix operators in an "intelligent" fashion. The where construct automatically results in a search for values of all instantiated variables (in this case 5), which make its right-hand-side true.

7. Scalability: Large-Scale Applications of SequenceL

Traditionally, when new languages are introduced in the literature a wide variety of relatively small problem solutions are used to indicate the comparative strengths and weaknesses of the language abstraction. The discussion below presents evidence of the scalability of SequenceL. Throughout the foregoing it has been noted that the NTD accomplishes the primary work from a semantics point of view. A more recently developed SequenceL interpreter in Haskell centers all translation around the NTD. Except for the declaration of the data structure used to implement the sequence and the definition of basic operations (e.g., arithmetic with scalars) all other language constructs are implemented in terms of the interaction between the NTD and the CSP. What this means is that all of the translation functions are treated like other user-defined SequenceL functions. Thus, the grounding of arguments and the evaluation of subscripts, free variables, conditionals, function bodies, and function references are governed by the CSP-NTD semantics. As an example, reference is again made to the SequenceL instantiate function and the manner in which the NTD is used to ground the variables of an arithmetic expression. Consequently, once basic core capabilities (primarily the NTD-CSP) are available, building a translator become a simple matter.

a. NASA Applications of SequenceL

In the above Description of the Related Art it was observed that the human costs for developing codes are increasing to the point that high level language solutions are becoming competitive to lower level codes, especially given the decreasing cost of computational power. For many critical applications the balance is beginning to tip in favor of declarative languages. At NASA, for example, there is a growing need to solve problems more rapidly. In many situations taking several days to fine tune a program that runs in 10 microseconds is unacceptable when an equivalent program in a high level language takes 20 microseconds to run, but can be written and executed in fewer days. The overall delay recommends the higher-level language. NASA's future exploration missions will not be as scripted as they have been in the past. On the long distance and long duration missions of the future, an ability to rapidly and dependably modify software capabilities is needed. Current approaches to software development and modification are unlikely to meet the NASA's future needs. One possible step toward addressing the needs of NASA and others in this field, is to test declarative language approaches for prototyping requirements.

Recently for example, SequenceL was used to prototype the requirements of an onboard system for NASA's Space Shuttle. The system of concern in this example is referred to as the Shuttle Abort Flight Manager (SAFM). A typical SAFM requirement as specified by NASA Guidance, Navigation, and Control (GN&C) engineers is presented in Table 2 below. In comparison to the above discussions, the requirement looks much like SequenceL. In the past, NASA developed prototypes apart from the requirements exemplified in Table 2. With minor changes to the requirements, depicted in Table 3 below, the requirement itself is a prototype since it is executable by the SequenceL interpreter.

3.7.4,13.1 Functional Requirements

TABLE 2

Example SAFM Requirement

| | | | |
|---|---|---|---|
| 3.7.4.13.1.1 | The signature of the Earth Fixed to Runway Transformation utility shall be as follows: | | |
| M_EFTo_Rw = EF_TO_RUNWAY(Lat, Lon, RW_Azimuth) | | | |
| 3.7.4.13.1.2 | The Earth Fixed to Runway Transformation utility shall perform the following algorithm: | | |
| | Cos(RW_Azimuth), | Sin(RW_Azimuth), | 0 |
| M = | -Sin(RW_Azimuth), | Cos(RW_Azimuth), | 0 |
| | 0 | 0 | 1 |
| | -Sin(Lat) * Cos(Lon), | -Sin(Lat) * Sin(Lon), | Cos(Lat) |
| MEFTopdet = | -Sin(Lon), | Cos(Lon), | 0 |
| | -Cos(Lat) * Cos(Lon), | -Cos(Lat) * Sin(Lon), | -Sin(Lat) |
| | M_EF_To_Rw = (M) • (MEFTopdet) | | |
| | Rationale: M is the Topodetic to RW matrix. | | |

The major change in the SequenceL version of the requirement is adding the matrix multiply definition and adding nested [ ]'s to denote the rows of the matrix. Since matrix computations (including matrix multiply) are the gist of the requirement, the NTD performs all the work in terms of the procedural aspects of the problem solution. In short, the NASA requirement, with only minor modifications, is executable in SequenceL.

TABLE 3

Executable SAFM Requirement in SequenceL

M_EF_To_Runway(scalar Lat,Lon, Rw_Azimuth) ::= M_EF_ToRw(
[   [Cos(RW_Azimuth),    Sin(RW_Azimuth),    0], TABLE 3-continued Executable SAFM Requirement in SequenceL

| | | |
|---|---|---|
| [-Sin(RW_Azimuth), | Cos(RW_Azimuth), | 0], |
| [0 | 0 | 1] |
| ], | | |
| [   [-Sin(Lat) * Cos(Lon), | -Sin(Lat) * Sin(Lon), | Cos(Lat) ], |
| [-Sin(Lon), | Cos(Lon), | 0 ], |
| [-Cos(Lat) * Cos(Lon), | -Cos(Lat) * Sin(Lon), | -Sin(Lat)] |
| ]) | | |

M_EF_ToRw$_{i,j}$(matrix M,MEFTopdet) ::= sum(M(i,all) * MEFTopdet(all,j))

In the example provided herein, SequenceL was therefore used to develop the requirements for the Shuttle Abort Flight Management System. As a result of the success of the SAFM effort, a SequenceL prototype was developed for the "flight rules checker" for NASA's Orion Crew Exploration Vehicle Onboard Abort Executive (CEV-OAE-FRC). This prototype software automates certain mission support decisions for the Orion vehicle, using a small set of "flight rules", identical to those written and used by human mission controllers. The SequenceL prototype was developed in parallel with a hand-coded CEV-FRC written by NASA Guidance, Navigation, and Control Engineers in C. The SequenceL requirements were compiled into C++.

The strengths of the SequenceL FRC include the ease of development and how well the SequenceL specifications match the engineers' intuitive understanding of the requirements. Notably, one error and one ambiguity in the specification were discovered in implementing the specification in SequenceL. These were not discovered in the process of implementing the specification in C. Both of these involved assigning values to variables that were later reassigned. The lack of assignment of variables in SequenceL was shown to be an important strength of the language allowing the effort to avoid errors not seen in the procedural approach. Subsequent work involving aerodynamic calculations has pointed out the strengths obtained by the NTD and free variables.

8. Syntax and Semantics of SequenceL

The following discussion presents the syntax and semantics of SequenceL, that is, a complete, rigorous description of the language and its meaning. It is this discussion that provides in part the enablement of the methodology of the present invention.

a. Syntax of SequenceL

Let U be a fixed set of user defined function symbols. The syntax of SequenceL over U is as follows (In practice, U is taken to be the set of symbols appearing as principal operators on the left hand side of function definitions appearing in the program, together with the built-in operators):

Constants:

```
Scalar::= true | false | Numeral
Const ::= nil | Scalar
```

Terms:

```
Prefix ::= abs | sum | transpose| Term | length
Prefix2::= ~
Infix ::= + | - | * | / | // | ^ | % | < | > | <= | >=
   | = | '|' | & | , | when | else | ++ | .. | ,
Term ::= Const | Prefix(Term)| Prefix2 Term
   | Term Infix Term | [Term] | U(Term)
```

Function Signatures:

```
Simpleorder::= s | ? | [Simpleorder]
Order::=  nil  |  Simpleorder  |  Simpleorder  *  Order
Signature(u) ::= u: Order -> Order, where u ∈ U
```

Function Definitions:

```
Arglist::= ∈| Identifier | Identifier Argtail
Argtail::= ,Identifier | ,Identifier Argtail
Definition(u) ::= u(Arglist) ::= Term, where u∈ U
Function ::=Signature(u) Definition(u), where u∈ U
```

Programs
  Program::=Function|Program Function
precedence classes (highest to lowest):
  1. ~
  2. ^
  3. */
  4. +−
  5. <<<=>=
  6. &
  7. |
  8. ++
  9. when
  10. else
  11. . . .
  12. ,
Association
  Infix operators within a precedence class associate from
    left to right, except else and ',' which associate right to
    left.
Grammar
  The above rules for precedence and association give a
    unique parse for any program formed in accordance with
    the BNF rules. Function signatures like the ones shown
    in the grammar are derived from type information for
    function parameters by a simple pre-processing macro.
  b. Syntax of Meta-SequenceL (MS)
  The semantics of SequenceL are given as a formal theory
of first order logic, which will be referred to herein as MS (for
meta-SequenceL). The language of MS contains the logical
symbols ∀∃¬∨∧ ( ) with their usual syntax, along with
countably infinitely many variables a, b, c, d a1, a2, a3, . . . .
MS contains the following binary infix predicate symbols:
  ∈=< ≤ ≥ >
MS contains the following infix function symbols:
  + − * / % ^
and the following prefix function symbols and constants
(numbers following slashes denote arities):

| | |
|---|---|
| −/1 | (unary minus) |
| R/0 | (the real numbers) |
| floor/1 | (greatest integer function) |
| true/0 | |
| false/0 | |
| undef/0 | |
| max/1 | (maximum element of a list of numbers) |
| domain/1 | (domain of a mapping) |
| g/5 | (helper function for list processing, see below) |
| h/3 | (helper function for list processing, see below) |
| range/1 | (range of a mapping) |
| openlist/0 | (atomic constant for list processing) |
| tmap/3 | (helper for normalize-transpose, see below) |
| s/2 | (denotation of a term with respect to a program) |
| s/1 | (denotation of a term using only built-in operators) |
| Ø/0 | (the empty set) |
| order/1 | (level of nesting of a data structure) |
| dist/2 | (distribute, aka map, an operator to a list of values) |
| trans/1 | (transpose a list of lists) |
| norm/3 | (normalization, see below) |
| numeral/1 | (maps numbers to their numeral representation not terminating in 9's) |

In addition, any SequenceL term enclosed in chevrons
(<<,>>), with 0 or more subterms replaced by MS variables,
is a term of MS, and any base-10 numeral not terminating in
9's is a constant symbol of MS. For example, 0.5 is a constant
symbol but the numeral 0.499999 . . . , which has the same
value as 0.5, is not. This is to give real numbers unique
representations.
  c. Signatures of Built-in Functions
  The signatures discussed in this section are considered to
be implicitly part of every program. The signatures of the built
in functions are as follows:
  Every built-in prefix operator p has the signature p: s→s
  ++ is the infix append operator; it operates on sequences
and returns a sequence. ',' operates on arbitrary terms and
returns a sequence. '=' operates on arbitrary arguments and
returns a scalar:
  ++: [?]*[?]→[?]
  ,: ?*?→[?]
  =: ?*?→S.
  when: ?*s→?
Every other infix operator i operates on a pair of scalars and
returns a scalar, and so has the signature:
  i: s*s→s
Every sequence c is considered an operator which maps i to its
ith member, and so carries the signature:
  c: s→?
  d. Interpretation of the Predicate and Function Symbols of
MS
  The symbols of MS are interpreted in a semantic domain U,
which is taken to be the smallest set containing the real
numbers, the atoms true, false, undef, and openlist, and closed
under the operations of Zermelo-Frankie set theory iterated
through finite ordinals. Tuples are realized as sets in the usual
way. Functions are allowed to be partial, though some are
made total by extending them to map to the atom undef where
they are intuitively undefined. The symbols ∈ and = are given
their usual interpretations on sets and atoms, and the other
infix predicates and functions are given their usual interpre-
tations in the real numbers. The prefix function symbols are
interpreted as follows:
  R denotes the real numbers;
  denotes unary negation;
  floor(x) denotes the greatest integer not exceeding the real
    number x, or denotes undef if x is not a real number;
  true, false, undef, and openlist denote their corresponding
    atoms;

max(x) denotes the maximum element of the set x of numbers if it exists, and
undef otherwise;
domain(f) and range(f) denote the domain and range, respectively of the mapping f,
ø denotes the empty set;
order(x)=0 if x is an atom or number, or n if x is a mapping from a finite set of integers to a set of items whose maximum order is n−1;
numeral(x) is the base-10 decimal representation of the real number x not terminating in 9's (if x is not a real number, numeral(x) is undef);
the function g(u,v,n,m,i) gives the ith element of the concatenation of two lists u and v, of length n and m respectively, formally:

$$g(u, v, n, m, i) = \lambda i \cdot u(i), 1 < i < n$$
$$v(i-n), n < i < n+m$$

the function h is used as a helper function to translate indices of lists:

```
h(m, n, i) = i−m+1 , m < i < n
    undef, otherwise;
denotation(<<s>>) = {0} ;
denotation(<<?>>) = {0,1,2...} ;
denotation(<< [x] >>) = {t+1 : t ∈ denotation(x)},
    where x is any simple type;
denotation (<<a₁*...*aₙ>>) is the vector <t₁,...,tₙ>,
    where t₁ is the denotation of a₁ ;
denotation(<<nil>>) = ∅ ;
tmap(i, f,P) is the set of argument types admissible
in the ith argument of function f in
    program P:
    tmap(i, f,P) = {k : <<f: x₁*...*xₙ−> y >> ∈P ∧ k ∈
    denotation(x₁).} ;
extend(i,k) returns k copies of t in a sequence, that is,
extend(t,k) denotes the function
    mapping i to t for i=1..k;
suppose t maps i to ai for i = 1..n, k is a positive integer,
and S is a subset of {1,...,n},
    then norm(t,k,S) maps i to ai' for i=1..n, where
    ai' = ai , i ∈ S,
```

```
extend(ai, k)otherwise ;
trans(t) =λi. λj. t(j)(i) where order(t)>1 ;
dist(p,T) = λi. p(t(i)) ;
``` if t($x_1$, ... $x_n$) is a SequenceL term with 0 or more subterms replaced by the MS variables x1, . . . xn, then <<t($x_1$, ... $x_n$)>> denotes the function which maps the n-tuple ($t_1$ ... $t_n$) of SequenceL terms to the SequenceL term obtained by replacing $x_i$ with ($t_i$) respectively.

The symbol s is the denotation function from SequenceL terms to their denotations in the semantics domain. In cases involving only built-in operators, the semantics are independent of any program and s is a function of a single parameter consisting of a SequenceL expression. In general, the denotation of an expression depends on a program containing definitions of user-defined functions, and so s is binary. Intuitively, if e is a SequenceL expression and P a SequenceL program, then s(P,<<e>>) denotes the value of the expression e with respect to the program P. That is, the evaluation of e obtained using built-in operators along with function definitions appearing in P. This interpretation is described formally by the axioms in the Drawing Figures.

e. Axioms of MS for Symbols Other than s

If c1, ... cn+1 are constant terms of MS, f is a n-ary prefix function symbol of MS other than s, and f(c1, ..., cn)=cn+1 is true in the interpretation of the discussion hereinabove, then f(c1, ..., cn)=cn+1 is an axiom of MS. If c1, c2, c3 are constant terms of MS and Op is an infix function symbol of MS where c1 Op c2=c3 is true in the interpretation then c1 Op c2=c3 is an axiom of MS. If c1, c2 are constant terms of MS and Op is an infix predicate symbol of MS where c1 Op c2 is true in the interpretation, then c1 Op c2 is an axiom of MS. This covers trivial axioms like 1+2=3, 7<8, etc. The usual symmetry, transitivity, and substitution axioms for equality are also axioms of MS.

f. Axioms for s

Table 4 illustrate axioms for the interpretation function s from SequenceL terms to the semantic domain. The axioms for built-in operators, Axioms 1-14, are written using the unary semantic function s/1. These are extended to cover semantics with respect to a given program by Axiom 15. Finally, the axiom for user-defined programs appears as Axiom 16.

TABLE 4

| | |
|---|---|
| Axiom 1: arithmetic operators | (∀a∀b)(s«a» ∈ R ∧ s«b» ∈ R → s«a + b» = s«a» + s«b» )<br>Similarly for ~, *, 1, %, floor |
| Axiom 2: equality | (∀a∀b) (s«a» = s«b» → s«a = b» = true)<br>(∀a∀b) (s«a» ≠ s«b» → s(«a = b» ) = false) |
| Axiom 3: arithmetic comparison | (∀a∀b) (s«a» ∈ Num ∧ s«b» ∈ Num ∧ s«a» < s«b» → s«a < b» = true)<br>(∀a∀b) (s«a» ∈ Num ∧ s«b» ∈ Num ∧ ¬(s«a» < s«b» → s«a < b» = false)<br>Similarly for >, <=, >= , < > |
| Axiom 4: Boolean operations | (∀a∀b) (s«a» = true ∧ s«b» = true → s«a and b» = true)<br>(∀a∀b) (s«a» = false ∨ s«b» = false → s«a and b» = false)<br>Similarly for or and not |
| Axiom 5: when | (∀a∀b)( s«b» = true → s«a when b» = s«a» )<br>(∀a∀b)(s«b» = false → s«a when b» = undef) |
| Axiom 6: else | (∀a∀b)(s«a» = undef → s«a else b» = s«b» )<br>(∀a∀b)(s«a» ≠ undef → s«a else b» = s«a» ) |
| Axiom 7: append | (∀a∀b)(s«a» ∈ Seq ∧ s«b» ∈ Seq ∧ max(domain(s«a» ))=n ∧ max(domain(s«b» ))=m →<br>s«a ++ b» = λi, g (s«a» , s«b» , n, m, i) )<br>where recall,<br>g (u, v, n, m, i) = λi, u(i) , 1≤j≤ n<br>v(i−n) , n<i≤n+m<br>(∀a∀b)(s«a » ∉Seq ∨ s«b»∉Seq → s«a ++ b» = undef) |

TABLE 4-continued

| | |
|---|---|
| Axiom 8: transpose | $(\forall a)\ (s《a》 \in Seq \wedge (\forall x \forall y)\ p(a,x,y) \rightarrow s《transpose(a)》 = \lambda i, \lambda j, s《a》(j)(i))$ where $p(a,x,y)$ denote the formula: $x \in range(s《a》) \wedge y \in range(s《a》) \rightarrow x \in Seq \wedge y \in Seq \wedge max(domain(x))=max(domain(y))$ |
| Axiom 9: | $(\forall a)(\forall b)(s《a》 \in Num \wedge s《b》 \in Num \rightarrow s《a \ldots b》 = \lambda i.\ h(s《a》, s《b》, i)$ Where, recall, $h(m, n, i) = i-m+1,\ m < i < n$ undef, otherwise |
| Axiom 10: sequences | $s《nil》 = \emptyset$ $(\forall a)(s《[a》 = (openlist, s《a》))$ $(\forall a)(\forall b)\ (s《a, b》 = (openlist, s《a ++ [b]》))$ $(\forall a)(\forall x)\ (s《a》 = (openlist, x) \rightarrow s《a]》 = x)$ |
| Axiom 11: function calls | $《f(x_1, \ldots, x_n) := T》 \in P \rightarrow$ $(\forall\ a_1) \ldots (\forall a_n)(\ (\forall\ i)(i \leq n \rightarrow order\{c_i\} \in tmap_i(f,P)) \rightarrow$ $sp《\ f(a_1, \ldots, a_n)》 = sp《\ T[x_1 \backslash (a_1), \ldots, x_n \backslash (a_n)]》)$ |
| Axiom 12: sequence subscripting | $(\forall a)\ (\forall b)\ (s《a》 \in Seq \wedge s《b》 \in domain(s《a》) \rightarrow s《a(b)》 = s《a》(s《b》))$ $(\forall a)\ (\forall b)\ (s《a》 \notin Seq \vee \neg s《b》 \in domain(s《a》) \rightarrow s《a(b)》 = undef))$ |
| Axiom 13: For each program P and function f of arity n defined in P, we have the normalize-transpose-distribute axiom | $(\forall a_1) \ldots (\forall a_n)\ (\forall S)\ (\forall k)\ (\forall m)\ ($ $S \subseteq \{1, \ldots n\}$ $\wedge$ $(\forall i)(\ i \in S \rightarrow ex(s《a》, i, f, P) = m)$ $\wedge$ $(\forall i)(0 < i \leq n \wedge i \neq S \rightarrow ex(s《a》, i, f, P) < m)$ $\wedge$ $(\forall i)\ (\forall j)\ (i \in S \rightarrow max(domain(s《a_i》) = k$ $\rightarrow$ $Sp《f(a_1, \ldots a_n)》 = Sp\ (dist(《f》, trans(norm((a_1, \ldots a_n), k, S))))$ where $ex(x, i, f, P)$ is an abbreviation for $order(x) - max(tmap(i,f.P))$, Note $ex(x)$ is allowed to range over extended integers, i.e., integers including positive and negative infinity. In particular, $max(tmap(i,f,P))$ will be infinite in case the signature of f in P has a '?' in the i'th argument. The antecedent of the main implication essentially says that S is the set of indices for which the expression ($<<$ f(a1, ..., an)》 is maximally overtyped, and that the maximally overtyped sequences are all of the same length k. The consequent says that we perform normalize-transpose-distribute, as explained informally in the text. |
| Axiom 14: Constants | $s(《true》) = true$ $s(《false》) = false$ $(\forall a)\ (a \in R \rightarrow s《a》 = numeral(a))$ |
| Axiom 15: For every SequenceL program P and every SequenceL expression e, the following is an axiom | $s(《e》) = s(P,《e》)$ |
| Axiom 16: Suppose P is a SequenceL program containing a function definition | $f(x_1, \ldots, x_n) = exp(x_1, \ldots, x_n)$ where f is an identifier, $x_1, \ldots, x_n$, are SequenceL variables, and $exp(x_1, \ldots, x_n)$ is a SequenceL expression containing no variables except possibly $x_1, \ldots x_n$. Then $s(P,《f(x_1, \ldots, x_n)》) = s(P,《exp(x_1, \ldots, x_n)》)$ is an axiom of MS. | g. Specification of Interpreters

The following definitions give the specification with respect to which SequenceL interpreters are verified:

Definition (Soundness of an Interpreter):

A SequenceL interpreter I is said to be sound if whenever I returns value v for the term t with respect to program P, $s(P,<<t>>)=v$ is a theorem of MS.

Definition (Completeness of an Interpreter):

A SequenceL interpreter I is said to be complete if whenever $s(P,<<t>>)=v$ is a theorem of MS, I returns the value v for the term t with respect to program P.

Since MS is a theory of standard predicate calculus, evaluation of most constructs is lazy in principal. However, keeping with the philosophy described herein above, SequenceL makes no commitment to how interpreters and compilers actually perform computations, provided they are sound. Similarly, the present invention makes no general commitments to the internal representation of sequences, e.g. as lists, arrays, dynamic arrays, etc. Different compilers may work differently; the same compiler may work differently for different sequences appearing in the same program, or even the same function definition.

9. SequenceL is Turing Complete

The Turing Completeness of SequenceL may be shown through an implementation of the Universal Register Machine (URM). A URM consists of an ordered pair (P, R) where P is a program (defined below) and R is an ordered multiset of positive integers known as the registers of the machine. The URM language is known to be Turing Complete. A URM program can be any one of the following strings enclosed in chevrons:

<<an>>, where n is an integer. This program increments the nth register.

<<sn>>, where n is an integer. This program decrements the nth register.

<<x; y>>, where y is a URM program and x is a URM program not of the form x1;x2. This program executes x and then y.

<<(x)n>>, where x is a URM program and n is a positive integer. This program executes x while the nth register is nonzero.

<<halt>>. This program halts the machine.

The URM's may be represented in SequenceL by strings generated by the following grammar:

| URM | ::= | ( (M), Regs ) |
|---|---|---|
| $M_0$ | ::= | ('a', integer)\| |
|  |  | ('s', integer)\| |
|  |  | ('lp', integer, (M))\| |
|  |  | 'halt' |
| M | ::= | $M_0$ \| $M_0$, M |
| Regs | ::= | ( ( integer, integer ) R1) |
| R1 | ::= | , ( integer, integer) R1 \| $\epsilon$ |

The memory of the machine is represented by a sequence of ordered pairs (n,v), where n is the register number and v is the value stored in that register. In reviewing the URM operations, it may be seen that a and s are the only operations that directly modify the register store, and that they both reference the register being incremented or decremented. The organization of the registers is a sequence of sequences, where the nested sequences provide a register number followed by the current value contained in that register.

In SequenceL, the a and s operations are carried out in a single function indecr, which operates on a single register. When presented with a sequence of registers, the NTD isolates the individual registers to which individual indecr's are to apply. Furthermore, the NTD reconstructs the sequence of registers once the various indecr activations complete.

```
indecr(scalar i, vector r, scalar op) ::=
    [i, r(2) + 1] when i = r(1) & op = 'a'
        else
    [i, r(2) − 1] when i = r(1) & op = 's'
        else r
```

Axioms 1, 5, 6, and 13 of Table 4 can be used to show that the input (i, r 'a'), where r is a sequence of register-value pairs, will return a version of r with the $i^{th}$ register incremented and no other change. Similarly, the input (i, r, 's') will return a version of r with the $i^{th}$ register decremented and no other change.

The urm function handles the control operations: sequencing, looping, and halting. It has two arguments; a sequence of instructions of unknown (?) nesting comprising a machine and a sequence of registers.

urm(?m, matrix r)::=[urm(m([2, . . . , length(m)]),indec(m (1,2),r,m(1,1))] (1)
  when m (1,1)='a' or m(1,1)='s' else
[urm(m(1,3)++m,r) when r(m(1,2),2)>0] (2)
  when m(1,1)='lp' else
[urm (m[2, . . . , length(m)]),r) when r(m(1,2),2)=0] (3)
  when m(1,1)='lp' else
r when m(1)='halt' (4)

The following is a proof that the above function implements the semantic operations of a URM. To do this, it must be shown that each of the bulleted URM operations is faithfully carried out when its SequenceL counterpart is supplied as an argument to the urm function. This will show that SequenceL is Turing Complete.

Let m=(p,r) be a SequenceL representation of a URM program. From the grammar rule for M, it follows that p is a sequence whose first member m1 is an M0. If m is a singleton, it must then be of one of the following four forms: (a, integer), (s, integer), (lp, integer, (M)) or 'halt'. The first two cases are handled by clause (1) and indecr, but the machine fails to reach a halt state. Consider the third case, say, m=('lp', n, (P)) for some integer n and URM program P. If the nth register of r is nonzero (i.e., if r contains (n, k) where k>0), Case (2) of the urm function will fire by Axioms 5 and 6 of the SequenceL semantics, executing P on r and then calling the machine again, by Axioms 3, 4, 7, 12, and 13. If r contains (n, 0), or if r does not contain (n, k) for any k, Case (3) is satisfied and the machine fails to halt. In the final case (4) where p='halt', the machine halts and returns r as desired, by Axioms 2, 5, 6, and 12.

In case P is not a singleton, again its first member m1 must be of one of the four forms (a, integer), (s, integer), (lp, integer, (M)) or halt. The last case is just as above. In the first two cases Axioms 12 and 13, together with the analysis of the indecr function, guarantee that the result of the machine is the result of executing its first instruction in p, followed by executing the tail of p, as desired. In the third case, where m1 is=('lp', n, (B)) for some integer n and URM program B, either r contains (n, k) where k>0, r contains (n, 0), or r does not contain (n, k) for any k. If r does not contain (n, k) for any k then the machine terminates without reaching a halt state by Axioms 2, 3, 5, and 6. If r contains (n, 0), then the tail of the machine is executed upon the existing registers by Axioms 5, 6, 12, and 13. Finally, if r contains (n, k) where k>0, Axioms 3, 5, 6 and 12 imply that the machine executes the body of the loop B on r and calls P itself again. This completes the proof.

10. Automatic Parallelisms

High performance computing can often achieve gains in performance by exploiting the power of multiple processors running in parallel. However, these gains come at a price in terms of coding. Parallel algorithms typically require the programmer to learn and use yet another set of programming constructs for directing parallel execution, on top of those required for specifying sequential iteration, which lie again on top of those required to execute basic operations. This is a difficult process. It has been estimated that the cost of developing parallel programs averages many hundreds of dollars per line of code. It has been shown herein how SequenceL can diminish the programmer's burden by reducing the need for sequential control structures. Recent research suggests that the language can be even more effective in reducing the burden of orchestrating parallel execution. As control structures are derived through SequenceL's normalize-transpose-distribute process, control and data parallelisms can be automatically detected and implemented without explicit direction by the programmer.

Different classes of parallel problems have been presented in the field. Three specific classes have been considered and the implicit parallelisms inherent in the problem solutions were discovered by SequenceL. These three classes (each of which is discussed above) are represented by:

Matrix Multiplication (in which parallel paths are independent),
  Gaussian Elimination (where there are dependencies among paths), and
  Quicksort (where the parallel paths cannot be predicted apriori, but unfold dynamically).

The parallelisms discovered are now based on the NTD and the nested NTDs when implementing the free variables. These simplifications have significantly improved the ability to generate sequential codes for many applications.

11. Related Work

Other work in the field would include efforts on NESL. NESL's comprehension operation is similar to NTD, except that it is triggered by an explicit syntax, whereas NTD is triggered by overtyped arguments. For example, addition of vectors u and v would be accomplished in NESL by:
   {x+y:x in u; y in v}
and in SequenceL by:
   u+v
At this level the NESL and SequenceL syntax are comparably readable, given a small amount of practice in each. However, the NESL comprehension syntax becomes cluttered if it is necessary to traverse deeper, nested data structures. Replacing vectors u and v with matrices a and b, in NESL we write:
   {{x+y:x in u; y in v}: u in a; v in b}
compared with SequenceL's:
   a+b
The SequenceL is still readable at a glance while the NESL is not. As this one line of code becomes ten thousand lines, and given the programmer the distraction of having to understand the abstract algorithm he is implementing on top of the code syntax, and these minuscule probabilities and few seconds are liable to add up to real errors and real delays.

If the depth of the data structures is not known at compile time, as with the instantiation algorithm discussed above, NESL must deploy recursion, and the code becomes comparable with the solution in LISP or Prolog. This is a direct consequence of the explicitness of NESL's syntax for distributing an operation over a data structure: if the depth of the structure is unknown, the number of nested levels of comprehension syntax is unknown as well.

Haskell's comprehension structure has the same feature of explicitness, as well as a static typing system, which can make generalized maps (such as the instantiation algorithm) clumsy to write. Other efforts have attacked this problem by supplying syntax and semantics for an everywhere construct, which simplifies the implementation of generalized maps. Instantiation can be implemented in such a framework as follows:
   instantiate1::var→val→token→token
   instantiate1 x v tlx=v=v otherwise=t
   instantiate x v exp=everywhere
   (mkT(instantiate1 exp))

This is a marked improvement over the plain Haskell solution given in the discussion above. The comparison with SequenceL on this problem is analogous to NESL vs. SequenceL on vector addition: SequenceL uses one small function instead of two. The extra function in the Haskell version is necessary to deploy the everywhere(mkT ( ... )) control construct. This construct marks the deployment of a generalized mapping, which is implicit under SequenceL's NTD.

In related efforts by others, an approach to the problem of generalized zips, that is performing operations on respective leaf nodes of trees, is carried out with identical structure. For an example of a generalized zip operation, we might add respective leaf nodes of the trees [1, [2, [3,4]], [5]] and [10, [20, [30,40]], [50]], to obtain [11,[22, [33,44]], [55]]. Using a defined gzipWithQ operator, this operation may be written as:
   gzipWithQ+[1,[2,[3,4]],[5]] [10,[20,[30,40]],[50]]
Giving semantics for gzipWithQ is an interesting result, because it has been pointed out that generalized zips at first appear to be somewhat tricky in the defined framework.

In SequenceL, generalized zips are part of the process, just like generalized maps. They are obtained automatically from the same semantics, the NTD. Written as follows:
   [1, [2, [3, 4]], [5]]+[10, [20, [30, 40]], [50]]
and the recursive 'zipping' operation occurs automatically, including the traversal of the input data structures, and assembly of the output structure.

The semantics of Haskell's everywhere and gzipWithQ operators are difficult largely because of Haskell's static type system. However, static typing brings certain advantages in performance and error checking Current implementations of SequenceL use dynamic typing, but it is an open question whether NTD can be used with static typing to achieve performance gains (while possibly sacrificing some flexibility and convenience in coding).

The following is a further comparison of SequenceL to APL, since earlier comparisons generally pre-date the NTD semantic.

12. APL and SequenceL

In this section, it is demonstrated how many of the advanced operations in APL are covered by the SequenceL NTD. APL code to find prime numbers up to some limit R would read as follows:
   PRIMES:(~R∈R°.×R)/R←1↓ιR
Clearly this definition requires very little in terms of keystrokes, but does require some documentation to decipher. APL is right associative. The ↓R generates the numbers from 1 to the limit R. If R is 6, then the list is [1,2,3,4,5,6]. The down-arrow on the list strips off the 1 and the left arrow assigns the resulting vector to R. From there R°.×R generates the outer product of the vector, which presents a matrix of the values obtained by multiplying the vector times itself:

| x | 2  | 3  | 4  | 5  | 6  |
|---|----|----|----|----|----|
| 2 | 4  | 6  | 8  | 10 | 12 |
| 3 | 6  | 9  | 12 | 15 | 18 |
| 4 | 8  | 12 | 16 | 20 | 24 |
| 5 | 10 | 15 | 20 | 25 | 30 |
| 6 | 12 | 18 | 24 | 30 | 36 |

Next, using set membership an APL selection vector is constructed. Each element of the selection vector indicates whether a corresponding number in R is in the table. The vector produced in our example in which R is 6 is [0, 0, 1, 0, 1]. The selection vector is negated and then, using the /-operator, it is used to select the corresponding elements from the original vector:
   [1, 1, 0, 1, 0]/[2, 3, 4, 5, 6] yields [2, 3, 5].
The equivalent functions in SequenceL are offered below. First, the outer product is produced by:
   table$_{I,J}$(vector N)::=N(I)*N(J)
The free variables are obtained via nested NTDs. The NTDs occur because the SequenceL function to ground free variables is defined on scalar values for the indices and is provided with vectors of values from 1 to the length of N. The remainder of the selection results from the comparison of each element of N with the elements of the table:

> primes2$_I$(scalar N) ::=
>    [2,...,N](I) when and(and( [2,...,N](I) =\=
>       table([2,...,N]))

This comparison(=\=for not equals) also involves two rounds of NTDs. A pair of and-reduces indicate whether the item is in the table. A more efficient and intuitive definition of primes in SequenceL is:
   prime(scalar N) N when and(0=\=N mod [2, ... , sqrt(N)])
To obtain the prime numbers up to some limit, one would reference primes with prime([2, ... , Limit]) and again NTDs would be performed at the function reference level.

In general, the equivalent of APL's selection vector can be easily accomplished in SequenceL, because NTDs are also performed on function bodies. A when-clause expects single Boolean values in its conditional part. If multiple values exist, NTDs are performed. Consider the definition of even numbers {x1 x∈N & x mod 2=0}. In SequenceL one obtains the evens with the function:

evens(vector N)::=N when N mod 2=0

The NTD carries out the primary work as usual:

INITIAL=even([1, 2, 3, 4, 5, 6])
CSP=[1, 2, 3, 4, 5, 6] when [1, 2, 3, 4, 5, 6] mod 2=0
CSP=[1, 2, 3, 4, 5, 6] when [1 mod 2, 2 mod 2, 3 mod 2, 4 mod 2, 5 mod 2, 6 mod 2]=0
CSP=[1, 2, 3, 4, 5, 6] when [1, 0, 1, 0, 1, 0]=0
CSP=[1, 2, 3, 4, 5, 6] when [1=0, 0=0, 1=0, 0=0, 1=0, 0=0]
CSP=[1, 2, 3, 4, 5, 6] when [false, true, false, true, false, true]
CSP=[1 when false, 2 when true, 3 when false, 4 when true, 5 when false, 6 when true]
CSP=[empty, 2, empty, 4, empty, 6]
CSP=[2, 4, 6]
FINAL=[2, 4, 6]

Other operators from APL, including the transpose and rotates are easily defined in SequenceL, and once again nested NTDs do the bulk of the work:

transpose$_{I,J}$(matrix N)::=N(J,I)
rotate_right$_{I,J}$(matrix N)::=reverse(N)(J,I)

13. Automatic Parallelisms for a Multi-Core Auto-Coder

It has been stated that parallel programming was once the sole concern of extreme programmers worried about huge supercomputing problems. With the emergence of multi-core processors for mainstream applications, however, parallel programming is poised to become a skill every professional software developer must know and master. Parallel programming is difficult in that it includes all the characteristics of traditional, serial programming but with three additional and well defined steps:

Identify parallelisms: Analyze a problem to identify tasks that can execute in parallel.

Expose parallelisms: Restructure a problem so parallel tasks can be effectively exploited. This often requires finding the dependencies between tasks and organizing the source code so they can be effectively managed.

Express parallelisms: Express the parallel algorithm in source code using a parallel programming notation.

The present invention enables programmers to create parallel software without writing explicit parallel algorithms. In many cases, if not most cases, the SequenceL language is an excellent candidate for efforts at automating the generation of parallel code because it is a small, general purpose, high level language with unique semantic features, which enable parallel code to be extracted from high level specifications. This disclosure presents key points to support this conclusion. In particular, it presents evidence of the simplicity and understandability of SequenceL problem solutions, introduces the computational laws (the Consume-Simplify-Produce and the Normalize-Transpose) from which parallelisms can be easily identified and exposed, and presents how algorithms are produced for a code generator that expresses parallelisms for multi-core processors. In doing so the disclosure of the present invention demonstrates how SequenceL automatically addresses the aforementioned three steps, or challenges, of parallel programming.

14. Computational Laws Governing Translation and Identify & Expose Parallelisms

The Consume-Simplify-Produce (CSP) and the Normalize-Transpose (NT) semantics, central to SequenceL, allow innovative approaches to code generation and the identification and exposure of parallelisms. The following discussion is an informal review of SequenceL's CSP-NT semantics. Recent work on a proof-of-concept interpreter has shown that apart from semantics to perform scalar arithmetic and other primitive operations, all other language constructs can be implemented elegantly in terms of the CSP-NT semantics. In other words, once the primitive operations and the CSP-NT exist it is possible to implement the instantiation of function arguments, subscripting of structures, evaluation of function bodies, and handling of function references. As for auto-parallelizing languages, FORTRESS is a "very large language" in which there are constructs for explicit and implicit parallelisms. However, the primary benefit of using FORTRESS for developing parallel applications mainly lies in automating the expression of the parallelisms, not so much in their identification or exposure. Other languages like UPC and Titanium are supersets of C and JAVA. These auto-parallelizing languages are typically an order of magnitude larger and more complex than SequenceL, and require programmer effort to identify and expose parallelisms.

15. Overview of the CSP and NT

From an abstract viewpoint, SequenceL possesses a single nonscalar data structure called a sequence. In accordance with the principles of data hiding, the semantics of sequences is declarative. There is no semantic commitment to how sequences are implemented, so a smart compiler might use a linked list, array, or binary search tree for sequences all in the same program, to achieve some intelligent optimization, similar to the way optimized handwritten code would look. A special sequence called the tableau is the workspace of the abstract SequenceL runtime environment (and is implemented by lists in the interpreters). Like any other sequence in SequenceL the tableau may contain constants, nested lists, function bodies, function references, variables, and SequenceL operators. For example, consider the following tableau:

[3*(4+12), [1,2,3], 12/4 when true else 12*4]

The SequenceL interpreter identifies all work to be done in the tableau, consumes it, simplifies the expression(s) ready to be evaluated, and produces the simplified expressions in what will become the next tableau. There is an inherent parallel quality to the evaluation. The work to be done in tableaus (above and below) is presented in boldface and can be done in parallel. From traces of the CSPNT's it is possible to automatically identify and expose parallelisms for code generation, thus meeting two of the above mentioned challenges. The next tableau follows:

[3*16, [1,2,3], 12/4]

Given this tableau, the next Consume-Simplify-Produce (CSP) step leads to a fixpoint and the final result:

[48, [1,2,3], 3]

A simple example of a user-defined function is:

fact(scalar n):=fact(n−1)*n when n>1 else 1

Notice that the CSP semantics handle the recursion with no additional special semantics for its evaluation:

| | |
|---|---|
| [fact(3)] | CSP |
| [fact(3−1) * 3 when 3 > 1 else 3] | CSP |
| [fact(2) * 3] | CSP |
| [(fact(2−1) * 2 when 2 > 1 else 2) * 3] | CSP |
| [(fact(1) * 2) * 3] | CSP |
| [((fact(1−1) * 1 when 1 > 1 else 1) * 2) *3] | CSP |
| [(1 *2) * 3] | CSP |
| [6] | |

The Normalize-Transpose (NT) concept therefore blends well with the CSP. In SequenceL, the rank of a data structure is basically its level of nesting. More precisely, scalars and the empty sequence are of rank 0; and for all n>0 a nonempty sequence of rank n is one whose members have a maximum rank of n−1. If an operation has actual arguments that outrank its formal parameters in one or more places (e.g., an arithmetic operator expects scalars and is provided a vector) then a NT is required. NT is the semantic from which most parallelisms can be identified and exposed as a result of the CSP steps. Consider the following example:

[1,2,3]*10

The multiplication operator is defined on scalars. In this case the operand, [1,2,3], outranks the scalar and has cardinality 3. A normalize will make 3 copies of the operator and 3 copies of the scalar1, 10:

[[1,2,3], [*,*,*],[10,10,10]]

Next, a transpose is performed on the normalized structure above resulting in three expressions that can be evaluated in parallel:

[1*10, 2*10, 3*10]

A full trace of the evaluation from the original expression follows:

| | |
|---|---|
| [1,2,3] * 10 | CSP |
| [1*10, 2*10, 3*10] | CSP |
| [10, 20, 30] | |

NT's are nested in successive CSP steps whenever structures are nested (in the code generator the NT will result in the generation of for-loops so that there will be no duplication of data and operators) and this enables the identification and exposure of nested parallelisms:

| | |
|---|---|
| [[1,2,3], [11,12,13]], * 10 | CSP |
| [[1,2,3] * 10, [11,12,13] *10] | CSP |
| [[1*10, 2*10, 3*10],[11*10, 12*10, 13 *10]] | CSP |
| [[10, 20, 30], [110, 120, 130]] | |

In practice, micro-parallelisms identified and exposed by the CSP-NT may not result in parallel execution due to performance issues. This simple set of semantics, the CSP-NT, scales to any SequenceL construct, including relations and function bodies.

| | |
|---|---|
| [1,2,3,4] when [1,2,3,4] mod 2 = 0 | CSP |
| [1,2,3,4] when [1 mod 2,2 mod 2,3 mod 2,4 mod 2] = 0 | CSP |
| [1,2,3,4] when [1,0,1,0] = 0 | CSP |
| [1,2,3,4] when [1 = 0, 0 = 0, 1 = 0, 0 = 0] | CSP |
| [1,2,3,4] when [false, true, false, true] | CSP |
| [1 when false, 2 when true,3 whenfalse,4 when true] | CSP |
| [2, 4] | |

Notice that when a when clause has no else and its condition fails, nothing is returned. A SequenceL function to produce the even numbers is written below:

evens(vector n):=n when n mod 2=0

In terms of transparency, a comparison can be made between the SequenceL evens function above and the set builder notation evens(S)={n|n∈S & n mod 2=0}. The CSP-NT also scales to function references. Reconsider the fact function with the following initial tableau:

| | |
|---|---|
| [fact([3,4,5])] | CSP |

[fact(3), fact(4), fact(5)]

The function's parameter is typed to be a scalar, but in this example is provided the vector, [3,4,5]. So an NT is first performed because the vector argument outranks the parameter of the function. Thus, SequenceL is also able to identify and expose parallelisms at the function level. If a corresponding function body has parallel opportunities, the CSP-NT will also identify and expose them, enabling other forms of nested parallelisms.

The CSP-NT semantics are also used to implement so-called "free variables." The matrix multiply example shown above and repeated below contains free variables I and J:

$MM_{I,J}$ (matrix m1,m2)=Sum(m1$_{I,all}$*m2$_{all,J}$)

The I and the J are not arguments of the function as they are free and their bindings are based on the cardinalities of the structures they subscript. Through nested NT's performed by the translator to process free variables, all combinations of subscript pairs are produced; effectively a Cartesian Product of the subscript values for I and the J are produced through nested NT's. The parallelisms, resulting from free variables, naturally fall out of the nested NT's used by the translator to implement free variables.

The CSP-NT's occur as a matter of process so that a problem solver need not know the mechanics employed to produce solutions from their high level specifications. SequenceL thus reduces control-dataflow complexities. Between the NT's, which apply operators to corresponding elements of non-scalar structures, and the nested NT's, which apply operators to the Cartesian Product of non-scalar structures, a formidable amount of the iterative and parallel control flow constructs are derived automatically from high-level SequenceL declarations.

16. The Parallel Code Generator

Figure 2A:
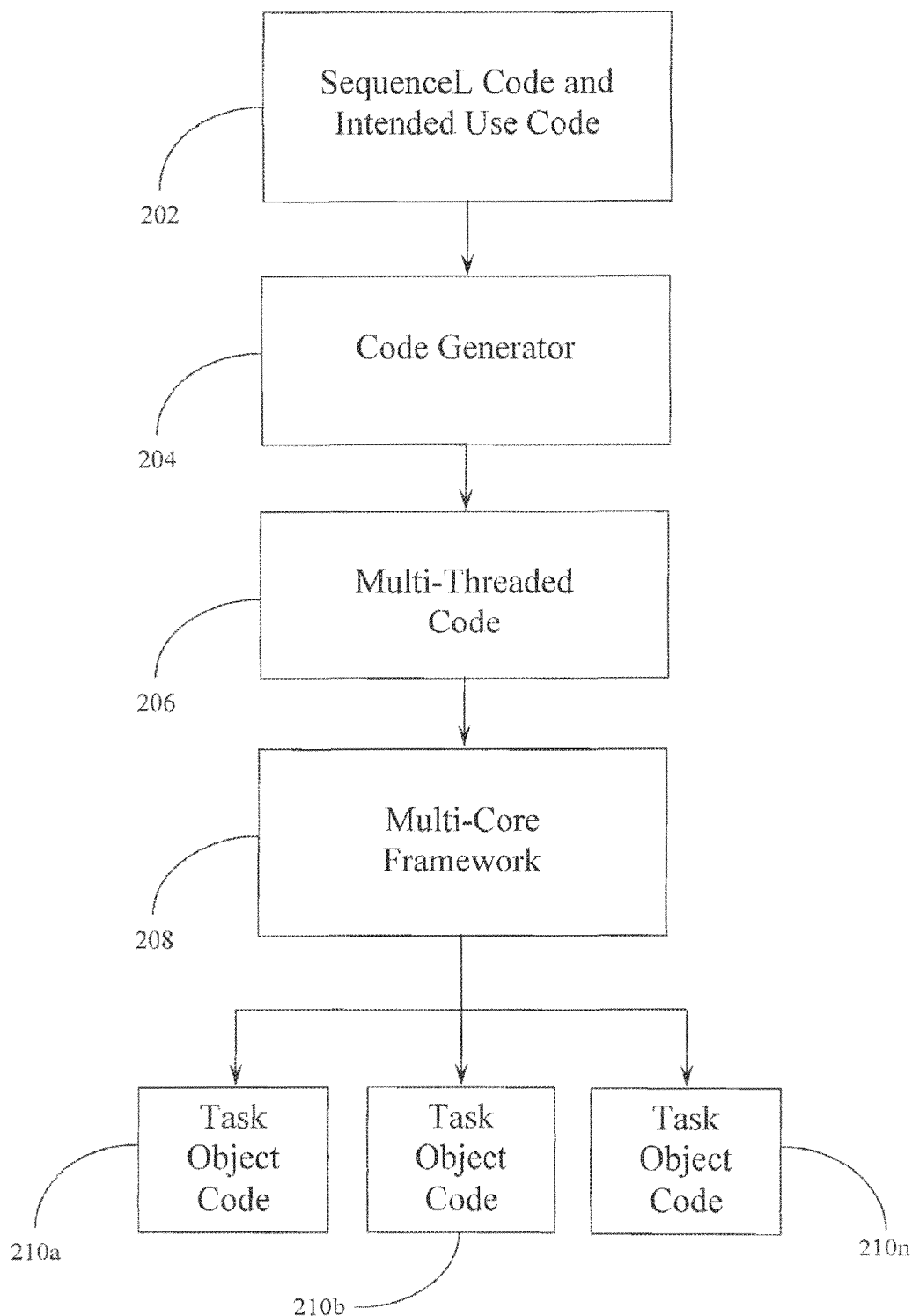
FIG. 2A is an illustration of process and code structure for automatically generating computer program multi-thread source and object code for a multi-core processing system, according to an embodiment of the present invention.

With the CSP-NT it is possible to identify and expose parallelisms. Already developed is a SequenceL-to-C translator, which automatically renders readable sequential C code from a combination of a SequenceL program and sample data input (called an intended use). Also possible is a SequenceL-to-C++ translator (multi-threaded C++ code) to run on a multicore framework as depicted in FIG. 2A. Source code 202 in the form of SequenceL is processed by compiler 204, which is implemented in Haskell, to produce multi-threaded source code 206 in C++, according to an embodiment of the invention. The multi-threaded source code 206 is processed by a run-time component 208, i.e., multicore framework, to produce instances of processing unit object code 210.a, 210.b, etc. through 210.N for N respective processor cores.

An execution-time framework supports the SequenceL to multi-threaded C++ code generator. The CSP-NT's generate parallelisms targeted for procedural for-loops. The code generator detects parallelisms arising in functions with two or more recursive calls.

An experimental environment has been developed and used to conduct a number of experiments including map-reduce examples. Map-Reduce is an algorithm template used by Google to parallelize searches. It turns out that the CSP-NT effectively subsumes the effects of the map-reduce functions (by subsume is meant that the more complicated Map-Reduce does not need to be written explicitly to express Google's search functions in SequenceL). Consequently, the SequenceL versions are more transparent than the map-reduce versions and SequenceL finds the parallelisms. As an example of one of Google's search functions, consider the grep function in SequenceL:

grepI(vector Line,Key)=Line when and (Line [I, . . . , I+size(Key)−1]=Key)

Using the experimental environment, the grep function with an intended use (searching 10,000 phrases each ranging from 1 to 10,000 words) compiles to the following code with outer loops executing in parallel in the framework:

```
#include "Grep.h"
void Grep::func(int index)
{ int pos = 0;
   Sequence<bool> eq(key.size( ) );
   bool andRes;
   for (int i=0; i<line[index].size( ) - key.size( ); i++)
   { for (int j=0; j<key.size( ); j++)
      {eq[j] = line[index][i+j] == key[j];
      }
      andRes = true;
      for (int k=0; k<eq.size( ); k++)
      {if (!eq[k])
         {andRes = false;
         break;
         }
      }
      if (andRes)
      {res[index].setSize(line[index].size( ));
         for (int l=0; l<line[index].size( ); l++)
         {res[index][l] = line[index][l];
         }
         break;
      }
   }
}
```

When run in the framework on the dual quadcores the following performance data was obtained (the sequential version of Grep running on one processor of a quadcore was written by hand eliminating the overhead associated with the auto-generated parallel versions run on 2 to 8 processors):

|  | Number of processors | | | | | | | |
| --- | --- | --- | --- | --- | --- | --- | --- | --- |
|  | 1 | 2 | 3 | 4 | 5 | 6 | 7 | 8 |
| Run times | 7.7779 | 3.867 | 2.59 | 1.952 | 1.675 | 1.327 | 1.194 | 1.019 |
|  | 7.757 | 3.875 | 2.591 | 1.956 | 1.574 | 1.322 | 1.159 | 1.03 |
|  | 7.78 | 3.867 | 2.588 | 1.952 | 1.585 | 1.326 | 1.148 | 1.011 |
|  | 7.758 | 3.874 | 2.593 | 2.031 | 1.576 | 1.324 | 1.178 | 1.073 |
|  | 7.775 | 3.867 | 2.588 | 1.954 | 1.653 | 1.332 | 1.147 | 1.032 |
|  | 7.758 | 3.869 | 2.593 | 1.951 | 1.593 | 1.376 | 1.144 | 1.008 |
|  | 7.772 | 3.869 | 2.588 | 2.187 | 1.582 | 1.32 | 1.168 | 1.015 |
|  | 7.758 | 3.867 | 2.59 | 1.952 | 1.582 | 1.323 | 1.155 | 1.008 |
|  | 7.776 | 3.868 | 2.592 | 1.952 | 1.593 | 1.332 | 1.142 | 1.013 |
|  | 7.758 | 3.868 | 2.592 | 1.951 | 1.576 | 1.378 | 1.141 | 1.008 |
| Average run time | 7.767 | 3.869 | 2.59 | 1.984 | 1.599 | 1.336 | 1.158 | 1.022 |
| Average Speedup Factor |  | 2.007 | 2.998 | 3.915 | 4.858 | 5.814 | 6.709 | 7.601 |

The multi-core framework also performs load balancing. As much as possible, each core of two Intel Quad Core processors performs work at all times. A program is split up into units of work. A processing unit (PU) object is set up for each core present in the machine. Each PU runs in its own thread and contains a list of available work. A PU executes a loop in which it searches its list for work to be done and then performs the work. If it reaches a point where there is no work in its own list, it asks another PU for work in order to balance loads on PU's. The PU's communicate through shared memory. If the asked PU has available work, it is added to the asking PU's work list and removed from the asked PU's list. Some units of work can be split, so only some of the work is sent to the asking PU. The framework need not perform garbage collection since the code generator C++ code and can piggyback its memory management.

Work has shown that representing computations in SequenceL allows most of the possible parallelisms available in a problem solution to be discovered automatically by the translators, built based on the CSP-NT. Experience so far indicates that the current approach is feasible and can result in effective parallel speedups. The example presented, the grep, is a relatively easy algorithm to parallelize; but the advantages of the present approach increase as the problems grow more difficult. SequenceL has been found to automatically discover all potential parallelisms in relatively complex algorithms involving multiple threads, and thus shows the potential to relieve more of the programmer's cognitive load as the problem grows in complexity.

Figure 3:
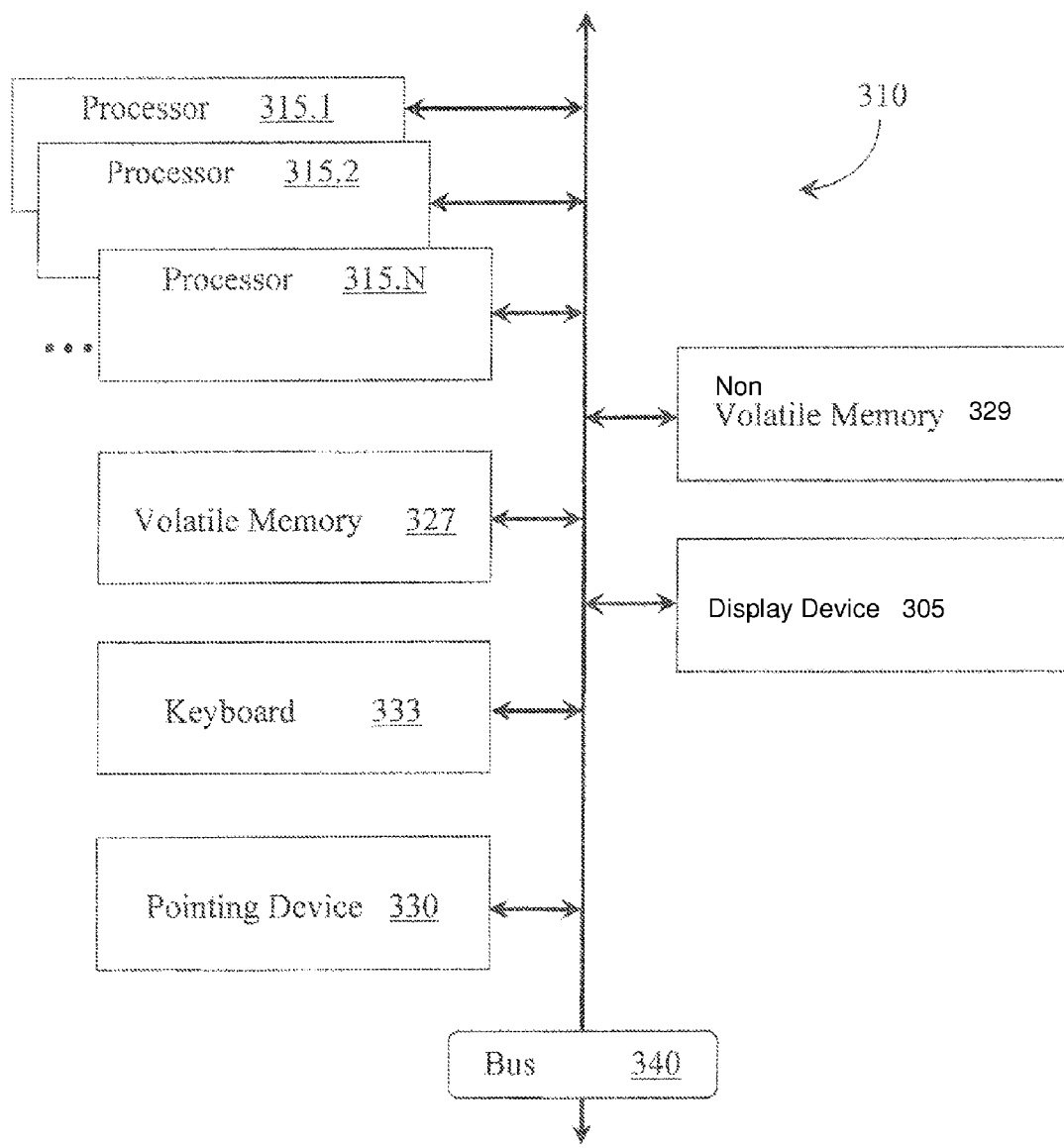
FIG. 3 is an illustration of an embodiment of a processing system for executing the computer program object code generated according to the process and structure of FIGS. 2A-2B, and/or for automatically generating the multi-thread source and object code as shown in FIGS. 2A-2B, according to an embodiment of the present invention.

Referring now to FIG. 3, a computer system 310 is shown that is generally applicable for the embodiments described. System 310 includes a number of processor cores 315.1, 315.2 through 315.N, a volatile memory 327, e.g., RAM, a keyboard 333, a pointing device 330, e.g., a mouse, a non-volatile memory 329, e.g., ROM, hard disk, floppy disk, CD-ROM, and DVD, and a display device 305 having a display screen. Memory 327 and 329 are for storing program instructions for code generator 204 and multi-core framework 208 as shown in FIG. 2A, which are executable by processor cores 315.1, etc. to implement various embodiments of a method, including a method for code generator 204 to automatically generate multi-threaded source code 206 from source code 202, and for multi-core framework 208 (which is a run time component) to generate task object code 210a, etc. from source code 206 and to execute task object code 210a, etc. on respective processor cores 315.1, etc., in accordance with and embodiment of the present invention. Source code 202 and 206, as well as object code 210a, 210b, etc. may, of course, also be stored in memory 327 and 329.

Components included in system 310 are interconnected by bus 340. A communications device (not shown) may also be connected to bus 340 to enable information exchange between system 310 and other data carriers. In various embodiments, system 310 takes a variety of forms. That is, it should be understood that the term "computer system" is intended to encompass any device having a processor that executes instructions from a memory medium. The memory medium preferably stores instructions (the "software program") for implementing various embodiments of a method as described herein in accordance with the present invention. In various embodiments the one or more software programs are implemented in various ways, including procedure-based techniques, component-based techniques, and/or object-oriented techniques, among others.

17. High Level Overview of CSP/NTD Process

Figure 4A:
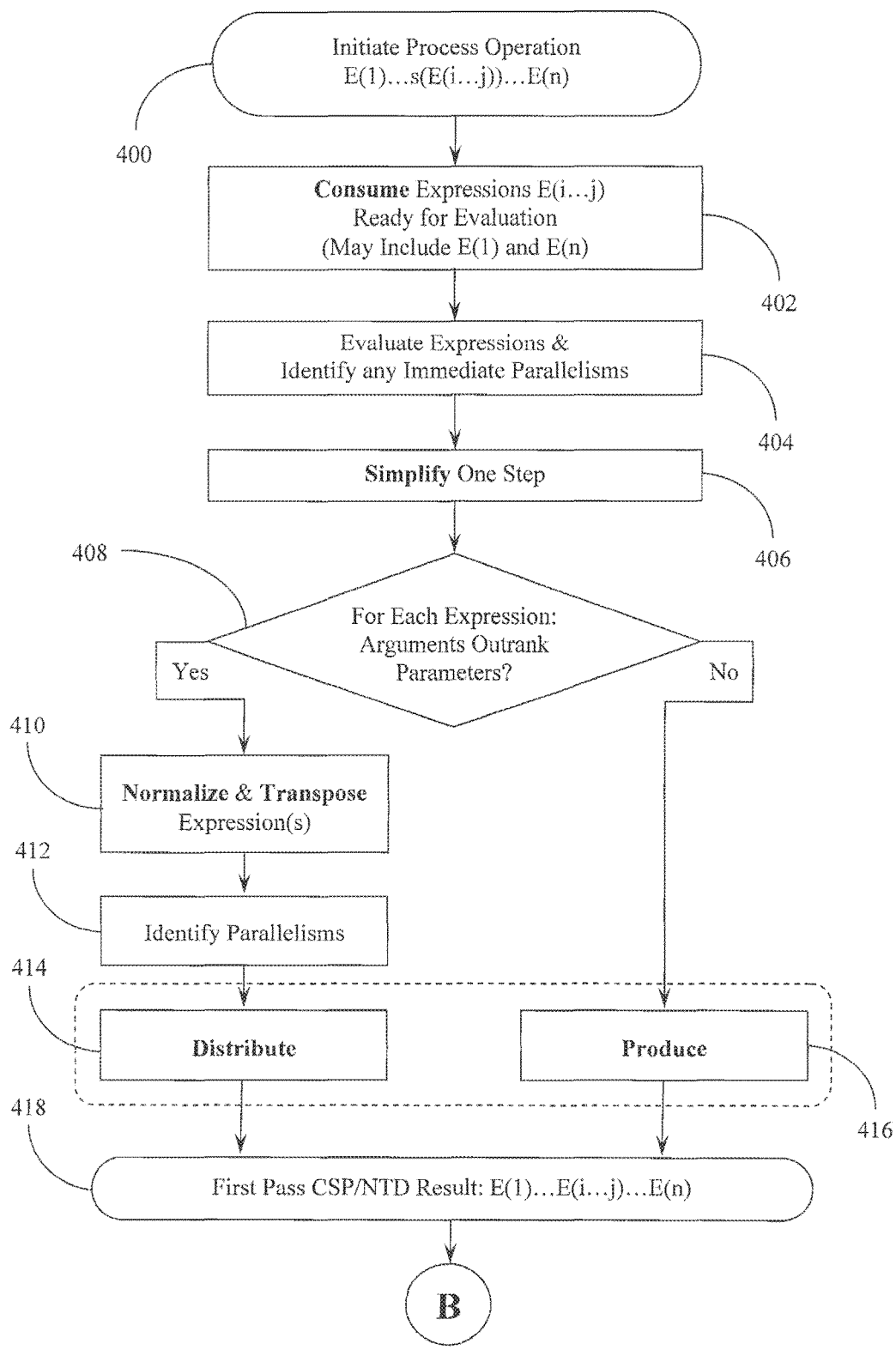
FIGS. 4A & 4B are flowchart diagrams disclosing the basic method steps associated with the Consume-Simplify-Produce (CSP) and Normalize-Transpose-Distribute (NTD) processes of the method of the present invention.
Figure 4B:
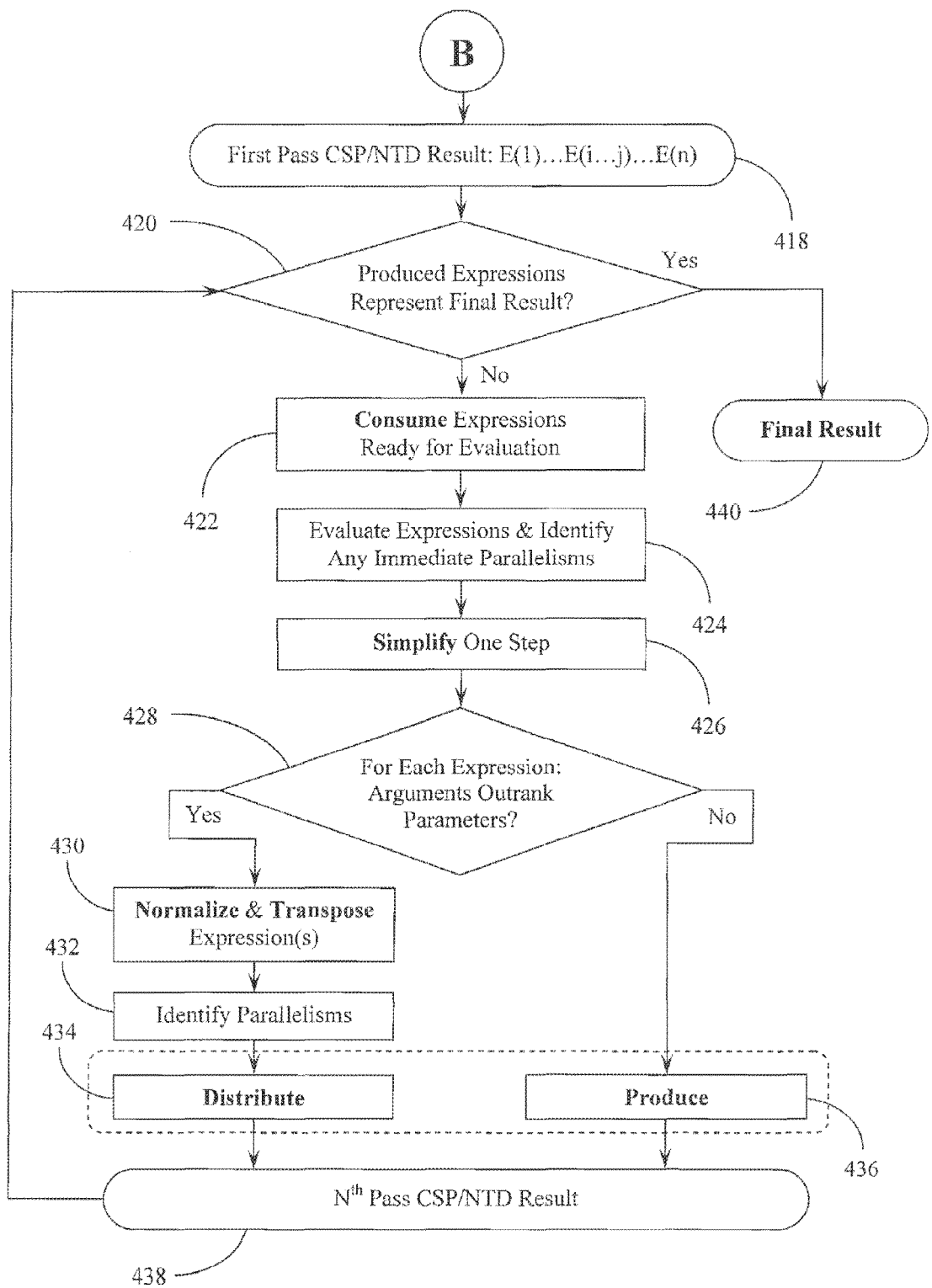

The basic methodology associated with the Consume-Simplify-Produce and Normalize-Transpose-Distribute processes are shown in FIGS. 4A & 4B. FIG. 4A represents the steps involved in an initial pass over a set of expressions while FIG. 4B represents a second and subsequent passes. It is understood however that with the simplest set of expression a single pass may be all that is required to arrive at the final result. It can be seen that one of the primary objectives of the present invention is the identification of parallelisms, or more specifically, opportunities for parallel processing to occur in a multi-core processor environment. Thus the two tenets of the present invention; transparency and parallelism identification are shown in the processes followed in the methodology of FIGS. 4A & 4B.

A set of expressions (E(1) . . . s(E(i . . . j)) . . . E(n)) are provided as the initiation of the process operation at Step 400. As a further basic example of the process the set of expressions chosen might be ((25−3/(8+3), 10*[1,2,3]) which can be seen as two expressions, one of which will lend itself to NTD processing. At Step 402 the method proceeds to Consume the expressions E(i . . . j) that are ready for evaluation. These expressions may include E(1) and E(n). In the example above the Consume Step 402 includes an evaluation that might immediately identify any straightforward parallelisms at Step 404. In the example, the expressions (25−3) and (8+3) may be evaluated in parallel to the NTD operation that will proceed on the 10*[1,2,3] expression. The result of these evaluations is the first Simplify Step 406.

In the process of simplification a determination is made as to whether an expression requires the NTD operation to achieve the final result. This query is made at Step 408 wherein for each expression it is determined whether the arguments of the expression outrank the parameters. If so, then the NTD process is performed. In the example, the query is answered in the affirmative for the 10*[1,2,3] expression which when Normalized and Transposed at Step 410 provides for an identification of parallelisms (10*1, 10*2, and 10*3) at Step 412. The NTD operation completes at Step 414 with the Distribute step wherein the example expression has become distributed as [10*1, 10*2, 10*3]. The last step in the first pass of the CSP operation is shown at the parallel Produce Step 416. In the example this parallel CSP operation has produced the expression 22/11. Overall, the first pass at the set of expressions shown in FIG. 4A has resulted in the First Pass CSP/NTD Result: E(1) . . . E(i . . . j) . . . E(n) shown at Step 418. In the example this intermediate result is (22/11, [10*1, 10*2, 10*3]).

As indicated above, while the first pass may produce the final result, it is generally the case that the expressions will be of a complexity that the CSP/NTD operations will be repeated. These subsequent passes are shown from Connector B in FIG. 4A to the same Connector B in FIG. 4B. The First Pass CSP/NTD Result: E(1) . . . E(i . . . j) . . . E(n) is again shown at Step 418 in FIG. 4B. An immediate query whether the produced expressions represent the final result is made at query Step 420. If the final result has not been reached, then the operation proceeds to Step 422 where the essential CSP/NTD operation is repeated. At Step 422 the method proceeds to again consume the expressions that are ready for evaluation. As above, the Consume Step 422 includes an evaluation that might immediately identify (or more specifically, carry forward from the previous NTD) any straightforward parallelisms at Step 424. In the example, the distributed expressions [10*1, 10*2, 10*3] may be evaluated in parallel to the 22/11 expression. The result of these evaluations is the Simplify Step 426.

Once again, in the process of simplification a determination is made as to whether an expression requires the NTD operation to achieve the final result. This query is made at Step 428 wherein for each expression it is determined whether the arguments of the expression outrank the parameters. If so, then the NTD process is performed. In the example, this query is not answered in the affirmative for the second pass. If it had been, however, the identified expression(s) would have been Normalized and Transposed at Step 430 (with further identification of parallelism at Step 432) and completed at Step 434 with the Distribute step. The last step in the second (or subsequent) pass of the CSP operation is shown at the parallel Produce Step 436. In the example this CSP operation has now produced (2, [10, 20, 30]). In general this second pass may produce the result (E(1) . . . s(s(E(i . . . j))) . . . E(n)) with the various expressions either fully simplified or reduced to a lower level expression. This $N^{th}$ Pass CSP/NTD Result is therefore arrived at Step 438 shown in FIG. 4B. In the example this result is (2, [10, 20, 30]) as mentioned above.

The $N^{th}$ Pass CSP/NTD Result is carried forward (back up) to query Step 420 where once again the query as to whether the produced expressions represent the final result is made. In the example, the second pass achieved the final result so the process completes at Step 440 with the Final Result produced. If the initial sequences of CSP/NTD operations do not produce the final result (i.e. some expressions require further simplification and processing) then the operation is repeated as many times as necessary to arrive at the final result. In the process, it can be seen how every parallel processing opportunity is identified and is presented or positioned for multi-core processing. In this manner it can be seen how even the most complex initial expressions can be translated into processing sequences that may be distributed across multi-core parallel processors. In addition, this operation is transparent to the programmer, having initiated the complex set of expressions without concern for identifying all of the intermediate steps that the methodology of the present invention carries out to produce the parallel program code.

While the present invention has been described in the context of a software application and a computer system, those of ordinary skill in the art will appreciate that the processes of the present invention are capable of being distributed as computer readable medium of instructions in a variety of forms and that the present invention applies equally regardless of the particular type of signal bearing media actually used to carry out the distribution. Examples of static computer readable media include recordable-type media such a floppy disc, a hard disk drive, a RAM, and CD-ROMs. The instructions may also be distributed by transmission-type media such as digital and analog communications links.

The present invention is directed towards the goal of eliminating the iterative control structures that process nonscalar data structures. While not completely eliminating the need for recursion it is recognized that some such recursion is necessary. The key feature of the language is its Consume-Simplify-Produce and the Normalize-Transpose-Distribute semantics. The NTD results in the discovery of the procedural aspects of many concurrently or iteratively solved problems, particularly those involving the decomposition of nonscalar data. Recursion comes as part of the process, in that it requires no formal or operational semantic definitions. In particular, the CSP semantics permit a function to "leave work" in the subsequent tableau. Since the remaining work could be a reference to the function itself, all that is required for the next execution of the function is to ground the variables assuming no NTDs are needed first. Return addresses or traditional activation records are not kept or managed in any of the SequenceL interpreters. It is also important to note that assignment of values to variables, either through input-output or through traditional assignment statements, is simply not supported in SequenceL.

18. Overview of the Design of a SequenceL Compiler

Figure 2B:
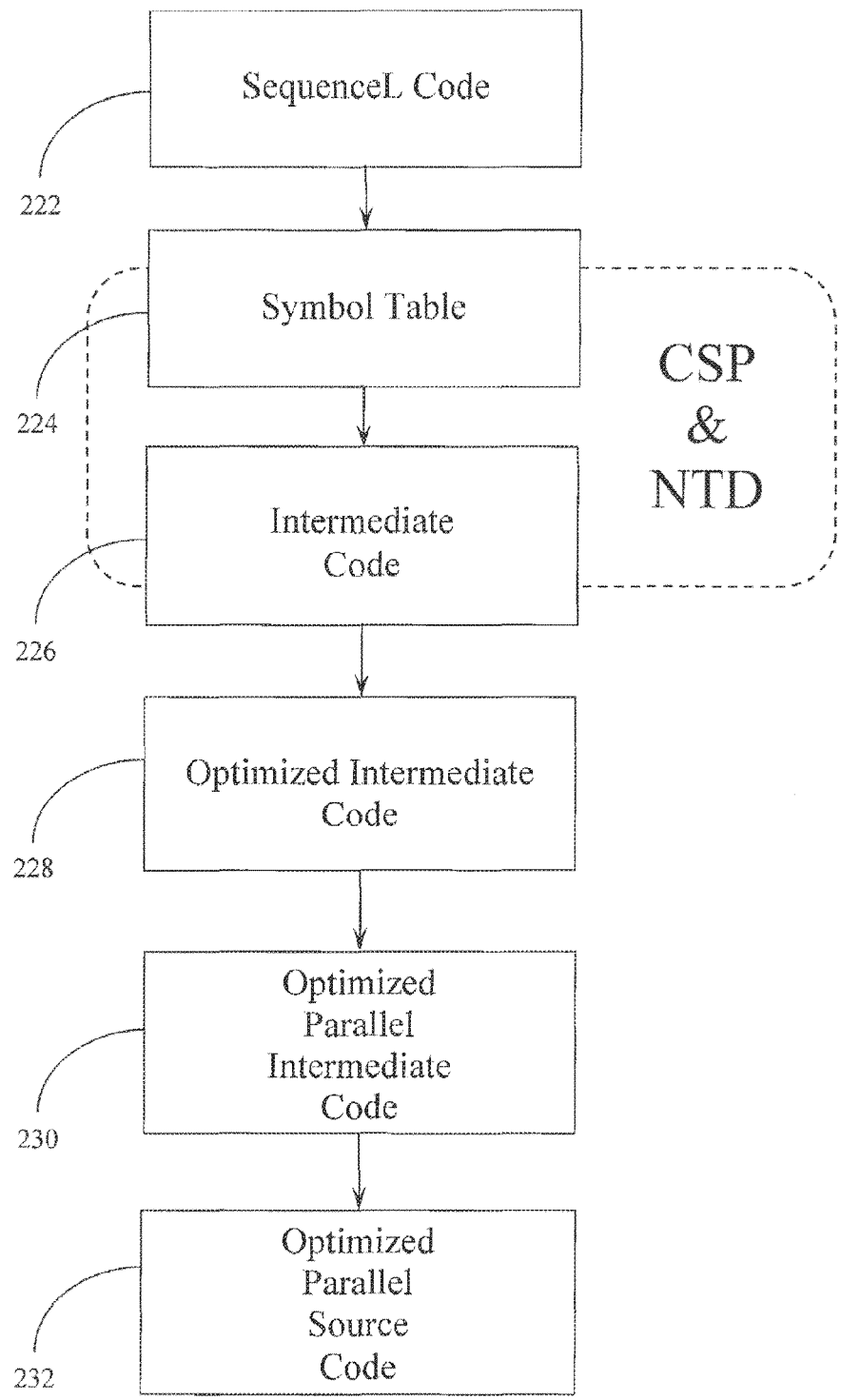
FIG. 2B is a high level flowchart showing the basic process of generating optimized parallel source code from SequenceL code.

The process of compiling the SequenceL Code involves a multistep process that includes (a) SequenceL Code to (Generated symbol table) to (b) Intermediate Code to (c) Optimized Intermediate Code to (d) Optimized Parallel Intermediate Code to (e) C++ Code (as an example of a source code). Reference is made to FIG. 2B for an overview of this compilation process.

(a) SequenceL Code to Symbol Table (Step 222 to Step 224 in FIG. 2B)

Parse SequenceL code. Create an entry in the symbol table for each function. Entry contains function name, expected arguments of the function and the tableau for the function. The symbol table is used for both the interpreter and the code generator.

Example:
SequenceL: f(a (2), b (2)):=(a+b)*2
Symbol Table: (f, [a, b], [2, 2], [*, [+, a, b], 2])

(b) Symbol Table to Intermediate Code (Step 224 to Step 226 in FIG. 2B)

Type Calculator:

The signature for each function is calculated based on the types of the input to the program and the signatures of the built-in operators. If there is an error in the type-checker, the user will be notified and the compilation will halt.

Intermediate code is a small symbol language that consists of assignment statements, for loops, and if statements.

Statement:=
    Assign Value Value|
    If Value Value Statements Statements|
    For Value Value Values Statements|
    Return Value A value can be a function call, variable or constant. For each function, Intermediate code is generated, along with a table containing all of the local variables and their types.

The simple semantics of SequenceL make code generation simple as well.

CSP—Assign Result (Function Call)
a when b else c—If Result b a c
NT—For Result Iterator [Arrays Indexed] (Function Call with indexed arguments)

The need for an NT is calculated using the symbol table generated in the previous step.

Example:

```
Symbol Table: ( f, [2,2], [*, [ +, a, b], 2])
Intermediate Code:
(f,
For tmp1 _i2 [a,b]
{
  For tmp1[_i2] _i3 [ a[_i2], b[_i2] ]
  {
    Assign tmp1[_i2][_i3] (+ a[_i2][_i3] b[_i2][_i3])
  }
}
For result _i4 [tmp1]
{
  For result[_i4] _i5 [ tmp1[_i4] ]
  {
    Assign result[_i4][_i5] (* tmp1[_i4][_i5] 2)
  }
}
}
Return result,
[(a, (int, 2, [ ])),
  (b, (int, 2, [ ])),
  (_i2, (int, 0, [ ])),
  (_i3, (int, 0, [ ])),
  (tmp1, (int, 2, [ ])),
  (_i4, (int, 0, [ ])),
  (_i5, (int, 0, [ ])),
  (result, (int, 2, [ ]))
]
)
```

(c) Intermediate Code to Optimized Intermediate Code (Step 226 to Step 228 in FIG. 2B)

Different compiler optimizations can be done to the intermediate code. The operations will take intermediate function definitions as input and return intermediate function definitions. Some optimizations that can be performed are: removal of invariants from loops, common sub-expression elimination and loop fusion. In the following example, loop fusion is performed.

Example:

```
Optimized Intermediate Code:

(f,
For result _i2 [a,b]
{
  For result[_i2] _i3 [ a[_i2], b[_i2] ]
  {
    Assign tmp1[_i2][_i3] (+ a[_i2][_i3] b[i_2][_i3])
    Assign result[_i2][_i3] (* tmp1[_i2][_i3] 2)
  }
}
Return result,
[(a, (int, 2, [ ])),
  (b, (int, 2, [ ])),
  (_i2, (int, 0, [ ])),
  (_i3, (int, 0, [ ])),
  (tmp1, (int, 2, [ ])),
  (result, (int, 2, [ ]))
]
)
```

(d) Optimized Intermediate Code to Optimized Parallel Intermediate Code (Step 228 to Step 230 in FIG. 2B)

Take Intermediate Code as input and returns intermediate code with tags on where the parallelizations should take place. The tags are placed in the definitions of the local variables. For example, if the for loop for an operation that stores its result in X is supposed to be parallelized, X will be tagged in the local symbol table. At this point there are two places that parallelizations are added.

(1) For Loops—Every for loop generated from an NT can be parallelized. At first, only the outermost for loops will be marked as parallel, but additional tests may be carried out to determine where the best places are to parallelize the for loops.

(2) Different Arguments to Function Calls—Each argument to a function call in SequenceL can be executed at the same time. That does not mean that they should be, however. At first, only arguments that lead to different loops will be executed in parallel.

Example:

---
Optimized Parallel Intermediate Code:
---
```
(f,
For result _i2 [a,b]
  {
    For result[_i2] _i3 [ a[_i2], b[_i2] ]
    {
      Assign tmp1[_i2][_i3] (+ a[_i2][_i3] b[i_2][_i3])
      Assign result[_i2][_i3] (* tmp1[_i2][_i3] 2)
    }
  }
Return result,
[(a, (int, 2, [ ])),
  (b, (int, 2, [ ])),
  (_i2, (int, 0, [ ])),
  (_i3, (int, 0, [ ])),
  (tmp1, (int, 2, [ ])),
(result, (int, 2, [parallel]) )
]
)
```
---

(e) Optimized Intermediate Code to C++ Code (Step 230 to Step 232 in FIG. 2B)

At present, libraries in C++ have been written for any of the generated code to use. The first library declares a Sequence datatype. All sequences in SequenceL are declared using this datatype. The library also includes all of the built-in operators for SequenceL, such as a summation and transpose functions.

Each function definition m Intermediate Code is translated to C++. Every argument to a function is passed as a constant reference since there will not be any re-assignment operations. All of the local variables are declared at the top of the function. The statements from the Intermediate Code are then translated into C++.
Example:

---
Sequential C++ code:
---
```
void f(const Sequence< Sequence< int > > &a, const Sequence<
Sequence< int > > &b, Sequence< Sequence< int > > &result)
{
Sequence< Sequence< int > > tmp1;
tmp1.setSize(min(a.size( ), b.size( )));
result.setSize(tmp1.size( ));
for (int _i2=0; _i2<tmp1.size( ); _i2++)
{
tmp1[_i2].setSize(min(a[_i2].size( ), b[_i2].size( )));
result[_i2].setSize(tmp1[_i2].size( ));
for (int _i3=0; _i3<tmp1[_i2].size( ); _i3++)
{
tmp1[_i2][_i3] = a[_i2][_i3] + b[_i2][_i3];
result[_i2][_i3] = tmp1[_i2][_i3] * 2;
}
}
}
```
---

(f) Optimized Parallel Intermediate Code to C++ Code Using Parallel SequenceL Framework The Parallel SequenceL Framework (PSF) was designed for multi-core chips. The aim of PSF is to split work evenly among all of the cores to maximize performance. A program in PSF is split up into units of work. There can be different types of work. (See FIGS. 5A & 5B). Each type of work must have the ability to execute work and split work. Two different types of work have been implemented: NT and Parallel Function Call.

Each core that is to be utilized by the program is given a list of work to perform. Each core will execute all of the work in its list one at a time until it has run out of work. Once a core has run out of work to execute, it will ask another core for work. If a core is asked for work it will move an item of work from its work list to the core which asked for work. If a core is asked for work and does not have any extra work, it will attempt to split the work that it is currently executing. If it can split the work, it will add the newly created work to the asking core.

NT Work: A unit of NT work is given a range of index values to execute and an operation to execute at a given index value. A unit of NT work executes by going through each index in the range in order and executing the supplied operation. A unit of NT work is split by creating a new unit of NT work that executes the same function as the original. The range of the new unit of work is the second half of the remaining work to be done by the original. For example, if the original work still has to execute indices 10 through 100, the original work will now execute indices 10 through 55 and the new work will execute indices 56 through 100.

In the example below, the outer for loop is turned into a unit of NT work. This is done by creating a class that is derived from the PSF provided NTObj. The new class will contain all of the inputs, outputs and local variables as data members. A constructor will be defined to initialize these data members. The actual function to perform at each index value will be defined as the method func. Where the original for loop would be in sequential code, a new NT object is created and given the range that the original for loop would have. The work is then added to the PSF controller, which will assign it to a core. If other cores need work, it will be split, as stated above.
Example:

---
Parallel C++ code:
---
```
void f(const Sequence< Sequence< int > > &a, const Sequence<
Sequence< int > >&b, Sequence< Sequence< int > > &result)
{
cont->add_work(new NT(0, min(a.size( ), b.size( )),
&nt1(a,b,result)));
}
class nt1: public NTObj
{
    private:
        const Sequence< Sequence< int > > &a;
        const Sequence< Sequence< int > > &b;
        Sequence< Sequence< int > > tmp1;
        Sequence< Sequence< int > > &result;
    public:
        nt1(const Sequence< Sequence< int > > &inp1, const
Sequence<Sequence< int > > &inp2, Sequence< Sequence< int > >
&o):
        a(inp1), b(inp2), result(o)
        {
            tmp1.setSize(min(a.size( ), b.size( )));
result.setSize(tmp1.size( ));
        }
        void func(int _i2)
        {
            tmp1[_i2].setSize(min(a[_i2].size( ), b[_i2].size( )));
result[_i2].setSize(tmp1[_i2].size( ));
for (int _i3=0; _i3<tmp1[_i2].size( ); _i3++)
{
tmp1[_i2][_i3] = a[_i2][_i3] + b[_i2][_i3];
result[_i2][_i3] = tmp1[_i2][_i3] * 2;
}
        }
}
```
---

Figure 5A:
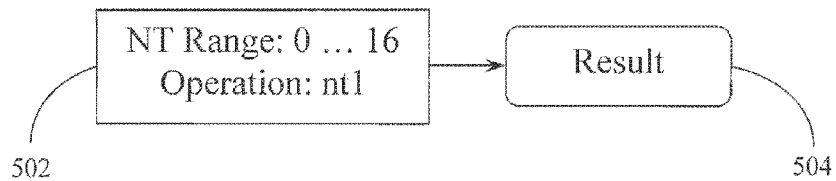
FIGS. 5A & 5B are schematic representations of two types of NT Work carried out according to the methods of the present invention.

Add Work—FIG. 5A provides a first schematic example of NT Work (Add Work) 502 distribution to produce a Result 504.

Figure 5B:
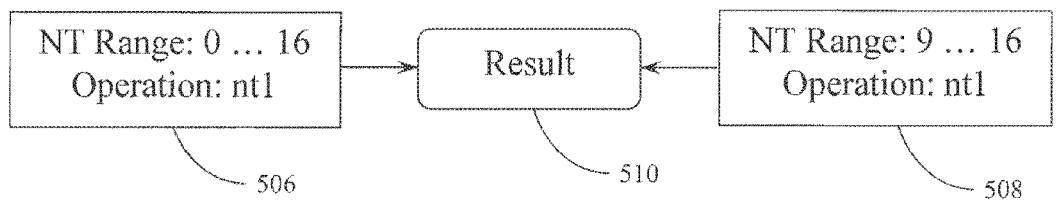

Split Work—FIG. 5B provides a second schematic example of NT Work (Split Work) 506 and 508 distribution to produce a Result 510.

Execute Work—When all of the units of work stemming from the original have completed executing, the program can use the result.

Parallel Function Call—A parallel function call is created to evaluate the different arguments to a function at the same time.

Executing a Parallel Function Call—A stack is created to evaluate the different arguments.

Example:
Assign tmp1 a
Assign tmp2 b
Assign tmp3 c
Assign x (f tmp1 tmp2 tmp3)

Figure 6A:
FIGS. 6A-6C are stack representations explaining certain the parallel processing identification and execution steps in the methods of the present invention.
Figure 6B:

In this example, the first three statements can be done in parallel. A call stack is created with all three statements added (See FIG. 6A). The top item in the stack is executed. When it is finished, it is popped off, with its result being stored in the item that called it (x in this example) (See FIG. 6B). When a, b and c are removed from the stack, x can be evaluated and then removed from the stack.

Figure 6C:
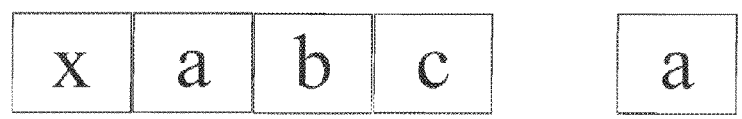

Splitting a parallel function call—A new stack is created, using a stack object that has not started evaluating yet. This new stack is sent to the asking core. In the example below, a is sent to another core. The original stack will not be able to execute x until a is finished (See FIG. 6C).

Once again it is helpful to make comparison between the use of SequenceL and other efforts to facilitate parallel processing and programming transparency. SequenceL is a very small, higher order, statically typed, Turing complete, and intuitive language employing strict evaluation. It has 12 grammar rules and very simple semantics. Apart from implementing standard arithmetic, relational, and structural (e.g. list concatenation) operators, SequenceL possesses only two simple computational laws: the Consume-Simplify-Produce (CSP) and the Normalize-Transpose (NT). All other features of the language are definable from these laws including recursion, subscripting structures, function references, and evaluation of function bodies. Given the fact that the language is strictly based on the CSP-NT, developing assurances concerning the code and handling parallelisms is simplified. Furthermore, SequenceL does not require recursion or specialized operators (like the maps and zips of Haskell) to distribute operations over lists. As a consequence of these properties, SequenceL displays a key feature required for development of trusted software, namely transparency, i.e. that a problem solution can be seen, at a glance, to do what the programmer wants.

Consume-Simplify Produce

A SequenceL interpreter has a workspace called a tableau, consisting of one to many SequenceL terms. The execution of a SequenceL program consists of a series of tableaus each resulting from a CSP step. In general, all terms in a given tableau that reference only constant arguments are consumed. The consumed work is then simplified, and the simplified work is replaced to produce the next tableau. For example, given the following tableau:

(20−5)/(10−3)

The Consume will remove the work ready to be done, namely 20−5 and 10−3. (Notice this work could be carried out in parallel.) The Simplify evaluates the work to be done resulting in 15 and 7, which are then Produced in the next tableau, resulting in:

15/7

Notice also, that only single simplifications occur; the complete expression is not fully evaluated. Consequently, the interpreter consumes the remaining work, namely 15/7, evaluates the expression and produces the next tableau, which is a fixpoint:

2.14286

Recursion comes free of charge as a side-effect of the CSP. Consider, for example, the function factorial defined by:

fact (n (0)):=fact (n−1)*n when n>1 else 1;

The 0 in fact's argument indicates that the argument expected is a scalar. Likewise, a 1 would indicate a vector; a 2 would indicate a matrix, etc. Given the initial tableau:

fact (3)

the CSP will consume the function reference, simplify it by instantiating the variable n in the function body, and produce the instantiated function body in the next tableau:

fact (3−1)*3 when 3>1 else 1)

The next CSP evaluates the condition 3>1 to true:

(fact (3−1)*3 when true else 1)

Next, the semantics of when are invoked to obtain:

(fact (3−1)*3)

The next CSP evaluates 3−1 and produces:

(fact(2)*3)

The reference to fact(2) is consumed (leaving the *3 in the tableau), the function body is instantiated with 2, and the instantiated function body is produced in the next tableau:

((fact(2−1)*2 when 2>1 else 1)*3)

Once again the function body is consumed, the condition is evaluated, and the true expression is left in the subsequent tableau:

((fact(2−1))*2)*3)

The remaining tableaus resulting from subsequent CSP's are predictable:

((fact(1))*2)*3)
((fact(1−1)*1 when 1>1 else 1)*2)*3)
(((1)*2)*3)
6

The need to deploy recursion in SequenceL is significantly reduced when compared to other functional languages. For example, using the so-called "generative construct", denoted by ", . . . ,", the same result is obtained by prod([1, . . . ,3])=prod([1,2,3])=6, which is similar to a Haskell solution of factorial. However, the Normalize-Transpose operation discussed in the next section further, and more significantly, reduces the need for recursion when compared to other functional languages.

Normalize-Transpose

The NT often serves as a possible simplification step in the CSP. The basic idea is that functions and operators are defined to work on scalars or nonscalars, which can be nested to different levels: 1,2,3, etc. A user-defined function may specify? to denote the fact that for the associated parameter, any level of nesting is permissible. Having the NT makes it possible to declare only the basic operation to be performed, very often eliminating the need for recursion to break apart nonscalars. If an operator, defined to work on structures of a depth n, is applied to a structure of depth m>n, the applied structure is said to be overtyped and at least one NT is performed. (For example, the function fact, in the previous section is defined to work on structures where n=0, i.e., scalars.) More generally, if m−n=i and i>1, NT's are applied i times in I successive CSP's. If m−n=i and i<1 an error message is issued, and if m=n, no NT is performed. Consider the following examples of the NT at work.

Given a tableau:

[1,2,3]*5

The consume will remove the expression from the tableau. However, simplification cannot immediately evaluate the expression since multiplication is defined only on scalars. Consequently, an NT will occur in the simplification step. Since the "overtyped" term [1,2,3] has 3 elements, three copies of the * and three copies of the 5 will be formed by the normalize, resulting in [[1,2,3],[*,*,*],[5,5,5]]. The transpose (similar to a matrix transpose) completes the simplification step resulting in the production of the next tableau:

[1*5,2*5,3*5]

All of these expressions can be evaluated in parallel. So they are all consumed from the tableau, evaluated in the simplification step, and yield the final result:

[5, 10, 15]

The NT scales naturally. Consider more complicated nested examples:

[[1,2,3], [4,5,6], [7,8,9]]*2
[[1,2,3]*2, [4,5,6]*2, [7,8,9]*2]
[[1*2, 2*2, 3*2], [4*2, 5*2, 6*2], [7*2, 8*2, 9*2]]
[[2,4,6], [8,10,12], [14,16,18]]

The middle two tableaus above contain opportunities for parallel evaluation. When an operator has more than one overtyped argument, the NT is performed with respect to the maximally overtyped argument:

[[1,2,3], [4,5,6], [7,8,9]]*[10,20,30]
[[1, 2, 3]*[10, 20, 30], [4, 5, 6]*[10, 20, 30], [7' 8, 9]*[10, 20, 30],
[[1*10, 2*20, 3*30], [4*10, 5*20, 6*30], [7*10, 8*20, 9*30]]
[[10, 40, 90], [40, 100, 180], [70, 160, 270]]

Below is the sequence of tableaus generated when a binary tree of integers is multiplied by a scalar:

[50, [43, [40,45]], [58, [52, 65]]]*2
[50*2, [43, [40, 45]]*2, [58, [52, 65]]*2]
[100, [43*2, [40, 45]*2], [58*2, [52, 65]*2]]
[100, [86, [40*2, 45*2]], [116, [52*2, 65*2]]]
[100, [86, [80, 90]], [116, [104, 130 ]]]

Again, as in the other examples, the NT does the heavy lifting. Rather than having to break structures apart, evaluate the operations, and reconstruct the structures recursively or iteratively, the CSP-NT performs the disassembly and reassembly automatically, leading to greater transparency in solutions. (Note, that the binary tree example is the only example that does not work in the aforementioned compiler—it only works in SequenceL interpreters.) Now, consider how the NT scales to function definitions. The following function performs a word count operation.

wc(words(1), key(0)):=(word:key,count:size (words when key=words));

This function is defined for a vector of words and a scalar keyword. The occurrences of the keyword in the vector of words are found with Words when Key=Words and then counted by the built-in size operation. Ultimately the function returns a two-item list consisting of the keyword with the number of times it appears in the vector of words. To preserve space, the "words" serving as arguments below are single letters. Words of varying length require no changes to the we function. If given a vector with multiple keys instead of the expected scalar keyword as below:

wc(["a","b","c","b"],["a","b"])

an NT is performed with respect to the user defined function because Key is restricted to being a scalar:

The next CSP instantiates the function bodies with the two arguments provided:
[(word: 'a',count:size(["a","b","c","b"]
when "a"=["a","b","c","b"])),
(word:"b",count:size(["a","b","c","b"]
when "b"=["a","b","c","b"]))]

The next simplification focuses on the two relations (underlined above). Since relational operators are defined on scalars, an NT is performed on both of the above relations:
[(word:"a",count:size(["a","b","c","b"]
when ["a"="a","a"="b","a"="c","a"="b"])),
(word:"b",count:size(["a","b","c","b"]
when ["b"="a","b"="b","b"="c","b"="b"]))]

Each relation in the two sets of relations can be evaluated in parallel:
[(word:"a",count:size(["a","b","c","b"]
when [true,false,false,false])),
(word:"b",count:size(["a","b","c","b"]
when [false,true,false,true]))]

The when is handled like any other operator. It will accept any structure on its lefthand side, but accepts only a single Boolean on its righthand side. Therefore, in the next CSP an NT is done with respect to the when:
[(word: "a",count:size(["a" when true,
"b" when false, "c" when false,
"b" when false])),
(word: "b",count:size(["a" when false,
"b" when true, "c" when false, "b" when true]))]

The eight when clauses can be evaluated in parallel. When a when clause has no else, and its condition evaluates to false, an empty is returned:
[(word: "a",count:size(["a"])),(word: "b",count:size(["b", "b"]))]

At this point the size operators can evaluate in parallel
[(word: "a",count:1),(word: "b",count:2)]

Transparency

There are other languages with similar goals as SequenceL. However, their transparency is often blurred by the need for recursion and/or the need to know specialized operators. For example, an expression for the sum of vectors u and v in NESL is:

{x+y:x in u; y in v} and in SequenceL is:

u+v

At this level the NESL and SequenceL syntax are comparably readable, given a small amount of practice in each. However, the NESL comprehension syntax becomes cluttered if we must traverse deeper, nested data structures. Replacing vectors u and v with matrices a and b, in NESL we write {{x+y:x in u; y in v}: u in a; v in b} compared with SequenceL's a+b

The SequenceL is still readable at a glance. We claim the NESL is not. We do not claim the NESL code is hard to read; a competent NESL programmer can grasp it with only a miniscule probability of error by looking at the code for just a few seconds. But this is typically true of any single line of code in any language. Now make it one often thousand lines, and give the programmer the distraction of having to understand the algorithm he is implementing on top of the code syntax, these miniscule probabilities and few seconds are liable to add up to real errors and real delays. This is why we claim transparency or readability at a glance is important.

The benchmarked problems include finding even numbers, prime numbers, Matrix Multiplication, Jacobi Iteration, and Quicksort. With the exception of SequenceL, not all languages are represented in each example: for instance APL shows up only for the prime number because it is often advertised to be a good example problem for APL. SequenceL versions are given for all of the benchmarked problems and all of the SequenceL versions result in parallelisms in the problem evaluations.

Even Numbers

Given a set S of integers, we define evens(S) as the set whose members are the even integers in S. In set-builder, evens(S)={x|x∈S & x mod 2=0}. Replacing the set S with a list for programming purposes, the most transparent solutions follow:

ML:
fun evens [ ]=[ ]|evens (h::t)=if (h mod 2=0) then h::evens t else evens t;

Haskell:
evens::[Int.]→[Int]
evens [ ]=[ ]
evens (x:xs)
| even x=x:(evens xs)
| otherwise=evens xs An alternative Haskell solution is defined by
evens:: [Int]→[Int]
evens xs=filter even xs The ML and Haskell solutions are obscured by the fact that list operators are applied to break apart and reconstruct the lists using recursion-or by both the writer and reader having to know the meaning of 'filter'. The Miranda and SequenceL solutions do not require recursion or special operators and both are easily mapped to the specification. Note: The Miranda solution will also work in Haskell. The Haskell solution above is designed to work with infinite lists through lazy evaluation; otherwise one can use list comprehension.

evens (e:x)=e:[n|n←x; n mod 2=0]

SequenceL:
evens(int(0)):=int when (int mod 2)=0;

Prime Numbers

A set builder expression for the set of prime numbers in the set S of integers is:

{x|x∈S& (X>1→∀i∈[2, . . . , sqrt(x)] (x mod i≠0) OR x=2)}

For the special case where S={1, . . . ,R], a commonly touted APL expression is given by:

(~R∈R°.×R)R←1↓ιR

The APL definition is terse and not transparent. Specialized knowledge of operators is needed. It is so difficult to read that an in-depth explanation is warranted. APL is right associative. The ιR generates the numbers from 1 to the limit R. If R is 6, then the list is 1,2,3,4,5,6. The down-arrow on the list strips off the 1 and the left arrow assigns the resulting vector to R. From there, R°.X R generates the outer product of the vector, which presents a matrix of the values obtained by multiplying the vector times itself:

| × | 2 | 3 | 4 | 5 | 6 |
|---|---|---|---|---|---|
| 2 | 4 | 6 | 8 | 10 | 12 |
| 3 | 6 | 9 | 12 | 15 | 18 |
| 4 | 8 | 12 | 16 | 20 | 24 |
| 5 | 10 | 15 | 20 | 25 | 30 |
| 6 | 12 | 18 | 24 | 30 | 36 |

Next, using set membership an APL selection vector is constructed. Each element of the selection vector indicates whether a corresponding number in R is in the table. The vector produced in our example in which R is 6 is (0, 0, 1, 0, 1). The selection vector is negated and then, using the I-operator, the corresponding elements from the original vector are selected: (1, 1, 0, 1, 0)/(2, 3, 4, 5, 6) yields (2, 3, 5).

A Miranda function for the general case is:
primes(p:x)=p:primes
[n|n←x; p←[2 . . . sqrt p]; n mod p>0]

The Miranda definition is much more transparent than APL, but requires recursion and the colon operator that separates the head of the list from its remainder.

And finally the equivalent in SequenceL:
primes(x(0)):=x when (all(x mod(2 . . . ceiling(sqrt(x))/=0) or x=2) and x>1;

SequenceL maps well to the set builder definition. Notice it is not a recursive solution and like the other functions result in parallelisms.

Experiments

This section presents comparison data from experiments focused on the respective speeds of SequenceL and parallel Haskell on three problems: matrix multiplication, word search, and quicksort. The data uses the Haskell compiler GHC version 6.10.1 running on Xenon Dual Quad Core Processors. The SequenceL compiler is written in a sequential version of Haskell and generates multi-threaded C++ code for the same machine. Both languages have a runtime component for the multi-core processors. For each experiment we ran 20 trials on each configuration (i.e., 20 on 1 processor, 20 on 2 processors, etc.). The matrix multiplication was performed in both languages on a 1000×1000 matrix. Below is the parallel Haskell version of the matrix multiplication problem:

```
multMat:: [[Int]]->[[Int]]->[[Int]]
multMat m1 m2=(multMatT m1 (transpose m2))
multMatT::[[Int]]->[[Int]]->[[Int]]
multMatT m1 m2T=
[[multVec row col|col<-m2T]|row<-m1]
multVec::[Int]->[Int]->Int
multVec v1 v2=sum(zip With (*) v1 v2)
multMatPar::Int->[[Int]]->[[Int]]->[[Int]]
multMatPar z m1 m2=
(multMat m1 m2) 'using' strat z
strat=blockStrat
lineStrat c=parListChunk c rnf
blockStrat c matrix--best?=let blocks=concat (splitInto-
    Clusters numB matrix)--result
splitted
--in numB*numB blocks
numB=round(sqrt (fromIntegral (length matrix)/fromInte-
    gral c))
--approx. same num/granularity of sparks as in others . . .
in parList mf block
type Vector=[Int]
type Matrix=[Vector]
splitIntoClusters::Int->Matrix->
[[Matrix]]
splitIntoClusters c m|c<1=
splitIntoClusters 1 m
splitIntoClusters c m1=mss
where bh=kPartition (length m1) c
bhsplit[ ][ ]=[ ]
bhsplit [ ]_=error
"some elements left over"
bhsplit (t:ts) xs=hs:(bhsplit ts rest)
where (hs,rest)=splitAt t xs
ms=bhsplit bh m1--blocks of rows
mss=map (colsplit bh) ms
colsplit [ ]_=[ ]
colsplit (t:ts) rs
|head rs==[ ]=[ ]
|otherwise=
(cab:colsplit ts resto)
where (cab,resto)=unzip
```

(map (splitAt t) rs)
-- helper for splitIntoClusters (formerly bresenham)
kPartition::Int->Int->[Int]
kPartition n k=zipWith(+) ((replicate (n 'mod'k) 1)++repeat 0)
(replicate k (n 'div'k))

Figure 7A:
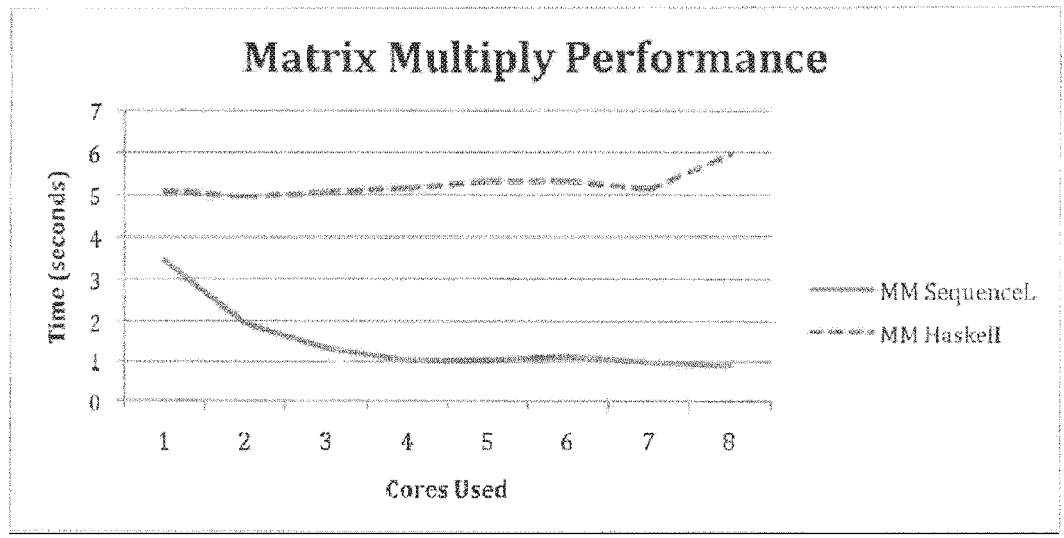
FIGS. 7A-7D are graphs showing performance results of one embodiment of the present invention.

The parallel code in SequenceL is the same as was seen previously:

matmul(x(2),y(2))[i,j]:=sum(x[i,all]*y[all,j]);

Note the transparency in the SequenceL code, and how transparency is extended by the fact that the code requires no annotation to guide the parallelisms. There are no such annotations needed or available in SequenceL. The comparative speeds on the same 1000×1000 matrix are shown in FIG. 7A. The x-axis is clock speed and the y-axis is the number of processors—speedups are implied by the graph.

The used Parallel Haskell version of a simple Grep (i.e., no regular expressions). It was experimented with adding par and seq commands to different parts of the program and show the results for the version with the best performance. The grep was performed on a 10,000,000 character file searching for a 5 character word. The parallel Haskell version of the simple-word search-grep is:

grep::[String]->String->[String]
grep lines key=filter (substring key)
lines
substring::String->String->Bool
substring[ ]_=True
substring_[ ]=False
substring (x:x.s)(y:ys)=checkFront 'par'
(checkRest 'pseq'(checkFront 11 checkRest))
where
checkFront=isPrefix (x:xs)(y:ys)
checkRest=substring (x:xs)ys
isPrefix::String->String->Bool
isPrefix[ ]_=True
isPrefix_[ ]=False
isPrefix (x:xs)(y:ys)(x==y)&&(isPrefix
xs ys)

Figure 7B:
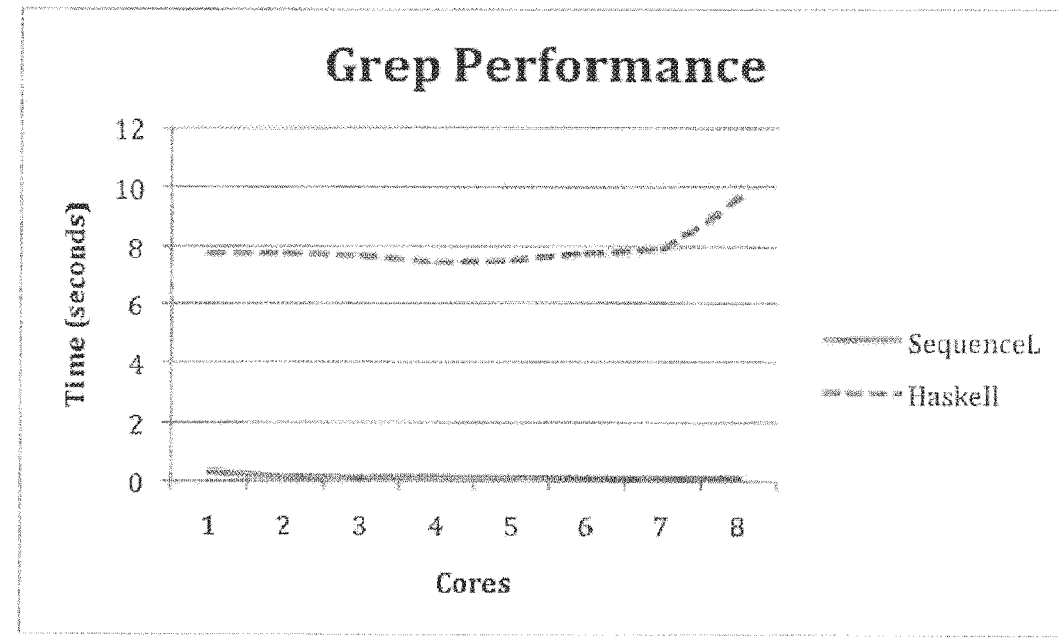
Figure 7C:
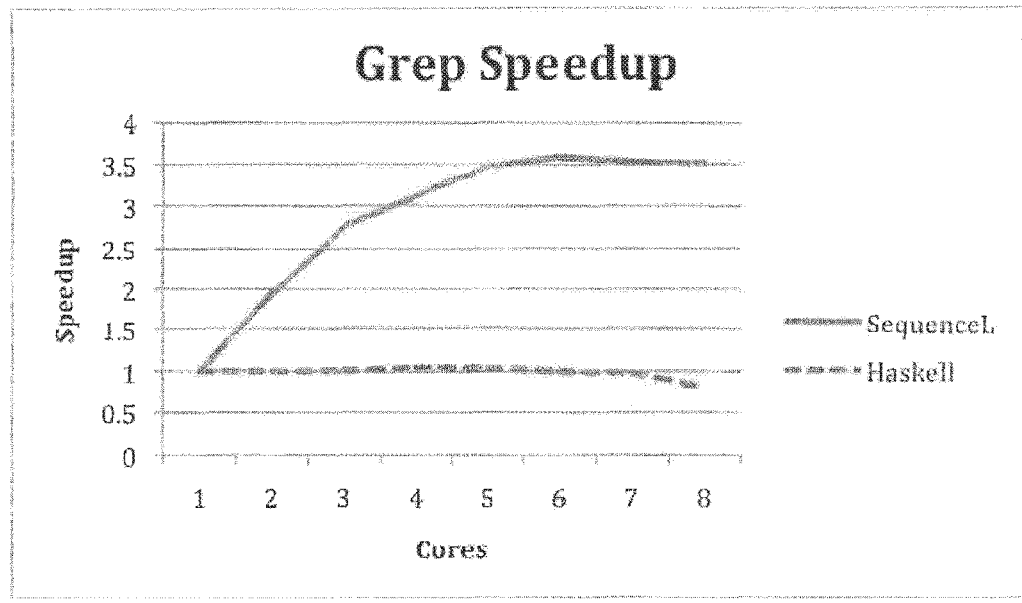

This solution was easier to read and it contains only one 'par' annotation to direct parallelisms. In SequenceL, the same problem is solved by:

grep (a(1),b (1)):=word_search (a,b,1 . . . (size(a)−size(b)+ 1));
word_search(a(1),b(1),n):=let str:=a[n . . . (n+size(b)−1)]; in
str when eq_list(str,b);

The performance results are shown in FIGS. 7B & 7C.

The Quicksort is an interesting parallel problem, because parallelisms are dynamic (i.e., you cannot predict parallelisms before execution because of the pivot). The experiment involved a list of 5,000,000 integers. Here is the parallel Haskell version of Quicksort:

quicksortS [ ]=[ ]
quicksortS [x]=[x]
quicksortS (x:xs)=losrt++(x:hisort)
'using' strategy
where
losort=quicksortS [y|y←xs, y<x]
hisort=quicksortS [y|y←xs, y>=x]
strategy result=
rnf losort 'par'
rnf hisort 'par'
rnf result 'par'
( )

Figure 7D:
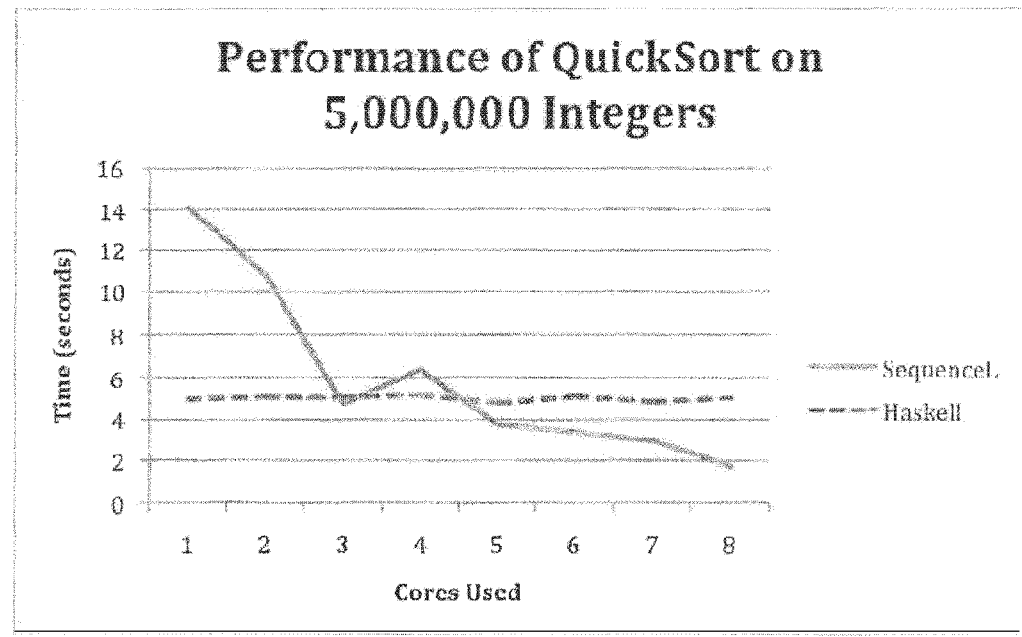

The SequenceL Quicksort follows:
great (a,b):=a when (a>b)

less (a,b):=a when (a<b);
quick (a(1)):=(quick (less (a,a[1]))++a[1]++quick(great (a,a [1]))) when (size(a))>1 else a;

Notice again that the SequenceL programmer does not have to identify the parallelisms. The performance results are shown in FIG. 7D.

The starting point of the SequenceL effort introduced the fact that iterative algorithms involve producing scalars from nonscalars, scalars from scalars, nonscalars from scalars, and nonscalars from nonscalars. Language constructs in SequenceL were formed based upon these classes of problem solutions. A better, but similar way to classify these algorithms involves catamorphisms (similar to nonscalars to ?), anamorphisms (similar to ? to nonscalars), and two additional morphisms one of which involves compositions of the cata- and anamorphisms. These compositions can be achieved using the SequenceL constructs. The early work concerning the classes of iterative problem solutions, eventually led to SequenceL. In addition to automatically deriving many iterative and recursive algorithms to traverse data structures, it has been shown how the use of SequenceL can automatically discover and evaluate parallelizable subtasks. SequenceL benefits further from the fact that the CSP-NTD semantics discovers many inherent parallelisms when functions and operators to nonscalar data structures. These results show that the SequenceL approach should allow scientists and engineers to express problem solutions that have greater appeal to their intuition.

What is claimed is:

1. An apparatus for generating an executable program code operable on a multiple processor electronic data processing machine, the executable program code directing a plurality of parallel paths in a multiple processor environment, the apparatus comprising:

a storage device; and
at least one processor connected to the storage device, the at least one processor:
(a) expressing each of a plurality of operations in a set of first level expressions of the operation,
(b) automatically generating source code language commands based on the first level expressions of the plurality of operations,
(c) automatically identifying parallelisms (parallel processing paths) exhibited in the generated source code language commands by (i) identifying any parallelisms (parallel processing paths) exhibited without simplification in the set of first level expressions of the plurality of operations, (ii) determining a level of nesting for each of the first level expressions, (iii) if the level of nesting is greater than a defined level then carrying out a normalize, transpose, distribute (NTD) process sequence on the first level expressions having a level of nesting greater than the defined level, (iv) if the level of nesting is equal to the defined level then carrying out a consume, simplify, produce (CSP) process sequence on the first level expressions having the level of nesting equal to the defined level, (v) identifying any parallelisms (parallel processing paths) exhibited in the normalize, transpose, distribute process sequence on the first level expressions having the level of nesting greater than the defined level, and (vi) identifying any parallelisms (parallel processing paths) exhibited after the consume, simplify, produce process sequence on the first level expressions having the level of nesting equal to the defined level,
(d) compiling the generated source code language commands into the executable program code, and (e) storing the executable program code to the storage device.

2. The apparatus of claim 1, the at least one processor further directing the parallel processing paths of the multiple processor electronic data processing machine using the executable program code.

3. The apparatus of claim 2, the multiple processor electronic data processing machine and the multiple processor environment comprising at least one multi-core processor.

4. The apparatus of claim 1, the at least one processor directing the parallel processing paths of the multiple processor electronic data processing machine using the executable program code instead of storing the executable program code to the storage device.

5. The apparatus of claim 1, the at least one processor expressing each of the plurality of operations in the set of first level expressions of the operation an imperative set of program language commands.

6. The apparatus of claim 1, the at least one processor expressing each of the plurality of operations in the set of first level expressions of the operation using a declarative set of program language commands.

7. An apparatus for generating an executable program code operable on a multiple processor electronic data processing machine, the executable program code directing a plurality of parallel paths in a multiple processor environment, the apparatus comprising:
a storage device; and
at least one processor connected to the storage device, the at least one processor:
(a) expressing in turn each of a plurality of operations in a declarative expression of the operation,
(b) automatically generating source code language commands based on the declarative expressions of the plurality of operations,
(c) identifying any parallelisms (parallel processing paths) exhibited without simplification in the operation expressions,
(d) determining a level of nesting of each of the operation expressions,
(e) if the level of nesting of any operation expression is greater than a defined level then carrying out a normalize, transpose, distribute (NTD) process sequence on the operation expressions,
(f) if the level of nesting of any operation expression is equal to the defined level then carrying out a consume, simplify, produce (CSP) process sequence on the operation expressions,
(g) identifying any parallelisms (parallel processing paths) exhibited in the normalize, transpose, distribute process sequence on the operation expressions,
(h) identifying any parallelisms (parallel processing paths) exhibited after simplification in the operation expressions,
(i) compiling the generated source code language commands into the executable program code, and
(j) storing the executable program code to the storage device.

8. The apparatus of claim 7, the at least one processor further directing the parallel processing paths of the multiple processor electronic data processing machine using the executable program code.

9. The apparatus of claim 8, the multiple processor electronic data processing machine and the multiple processor environment comprising at least one multi-core processor.

10. The apparatus of claim 7, the at least one processor directing the parallel processing paths of the multiple processor electronic data processing machine using the executable program code instead of storing the executable program code to the storage device.

11. The apparatus of claim 7, the at least one processor expressing each of the plurality of operations in the set of first level expressions of the operation an imperative set of program language commands.

12. The apparatus of claim 7, the at least one processor expressing each of the plurality of operations in the set of first level expressions of the operation using a declarative set of program language commands.

13. An apparatus for generating an executable program code operable on a multiple processor electronic data processing machine, the executable program code directing a plurality of parallel paths in a multiple processor environment, the apparatus comprising:
a storage device; and
at least one processor connected to the storage device, the at least one processor:
(a) expressing in turn each of the plurality of operations in a declarative expression of the operation,
(b) generating a symbol table from each of the declarative expressions of the plurality of operations,
(c) generating an intermediate program code expressing the operations associated with the elements in the generated symbol table,
(d) optimizing the generated intermediate program code and disclosing any parallelisms (parallel processing paths) in the optimized intermediate program code that are exhibited after performing a normalize, transpose, distribute (NTD) process sequence combined with a consume, simplify, produce (CSP) process sequence,
(e) compiling the generated intermediate program code into optimized parallel source code based on the disclosed parallelisms,
(f) compiling the generated source code language commands into the executable program code, and
(g) storing the executable program code to the storage device.

14. The apparatus of claim 13, the at least one processor further directing the parallel processing paths of the multiple processor electronic data processing machine using the executable program code.

15. The apparatus of claim 14, the multiple processor electronic data processing machine and the multiple processor environment comprising at least one multi-core processor.

16. The apparatus of claim 13, the at least one processor directing the parallel processing paths of the multiple processor electronic data processing machine using the executable program code instead of storing the executable program code to the storage device.

17. The apparatus of claim 13, the at least one processor expressing each of the plurality of operations in the set of first level expressions of the operation an imperative set of program language commands.

18. The apparatus of claim 13, the at least one processor expressing each of the plurality of operations in the set of first level expressions of the operation using a declarative set of program language commands.

19. An apparatus for identifying one or more immediate parallel operations within an operation comprising:
a storage device; and
at least one processor connected to the storage device, the at least one processor:
(a) receiving the operation comprising a set of expressions, (b) consuming each expression in the set of expressions that is ready for evaluation, if any, (c) evaluating the set of expressions and identifying any immediate parallel operations, if any, (d) simplifying the one or more expressions, (e) selecting one of the simplified expressions, (f) if the selected simplified expression contains one or more nested expressions, (i) normalizing and transposing the one or more nested expressions, (ii) evaluating the normalized and transposed expressions and identifying any immediate parallel operations, if any, and (iii) distributing the normalized and transposed expressions, (g) if the selected simplified expression does not contain one or more nested expressions, producing a result for the simplified expression, (h) if the operation contains any expressions that have not been selected, repeating steps (e) through (h) until all of the expressions have been have been selected, (i) if all the produced results do not represent a final result for the operation, repeating steps (b) through (i), and (j) if all the produced results represent the final result for the operation, producing the final result for the operation.

20. The apparatus of claim 19, the at least one processor further storing the final result for the operation to the storage device.

21. The apparatus of claim 19, the at least one processor further providing the final result for the operation to a multiple processor electronic data processing machine.

* * * * *